United States Patent
Bhattad et al.

(10) Patent No.: US 8,831,522 B2
(45) Date of Patent: Sep. 9, 2014

(54) SYSTEM AND METHOD TO ENABLE RESOURCE PARTITIONING IN WIRELESS NETWORKS

(71) Applicant: Qualcomm Incorporated, San Diego, CA (US)

(72) Inventors: Kapil Bhattad, Bangalore (IN); Ravi Palanki, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/024,601

(22) Filed: Sep. 11, 2013

(65) Prior Publication Data

US 2014/0011507 A1  Jan. 9, 2014

Related U.S. Application Data

(63) Continuation of application No. 12/465,422, filed on May 13, 2009, now Pat. No. 8,554,147.

(60) Provisional application No. 61/055,384, filed on May 22, 2008.

(51) Int. Cl.
| | |
|---|---|
| *H04B 1/00* | (2006.01) |
| *H04B 15/00* | (2006.01) |
| *H04W 72/04* | (2009.01) |
| *H04L 1/00* | (2006.01) |
| *H04L 5/00* | (2006.01) |
| H04W 28/04 | (2009.01) |
| H04W 28/18 | (2009.01) |
| H04L 1/18 | (2006.01) |

(52) U.S. Cl.
CPC ......... *H04L 5/0073* (2013.01); *H04W 72/0406* (2013.01); *H04W 28/04* (2013.01); *H04L 1/0001* (2013.01); *H04W 28/18* (2013.01); *H04L 1/1867* (2013.01)
USPC ........ 455/63.1; 455/63.2; 455/63.3; 455/63.4

(58) Field of Classification Search
USPC .................................................. 455/59–355
See application file for complete search history.

(56) References Cited

U.S. PATENT DOCUMENTS

| 5,555,257 A | * | 9/1996 | Dent .............................. 370/319 |
| 7,367,045 B2 | * | 4/2008 | Ofek et al. ........................ 726/2 |

(Continued)

FOREIGN PATENT DOCUMENTS

| CN | 1805307 A | 7/2006 |
| CN | 1885849 A | 12/2006 |

(Continued)

OTHER PUBLICATIONS

International Search Report and Written Opinion—PCT/US2009/044912—International Search Authority, European Patent Office, Jun. 29, 2010.

(Continued)

*Primary Examiner* — Brandon S Cole
(74) *Attorney, Agent, or Firm* — Paul Kuo

(57) ABSTRACT

Systems and methodologies are described that facilitate improved resource partitioning and interference management in a wireless communication system. Techniques are described herein for the transmission and use of various types of signaling, such as Access Request commands, Reverse Link Special Resource Utilization Message (R-SRUM) signaling, Forward Link Special Resource Utilization Message (F-SRUM) signaling, and the like, for managing interference associated with range extension, restricted association networks, and other jamming scenarios. As described herein, downlink resource coordination and interference management are accomplished through the use of Access Request or R-SRUM signaling conducted in a unicast or broadcast fashion, and uplink resource coordination and interference management are accomplished through the use of F-SRUM signaling. As further described herein, a clean communication channel such as a Low Reuse Preamble (LRP) channel can be utilized for interference management signaling and/or leveraged for determining timing of various signaling messages.

20 Claims, 22 Drawing Sheets

(56) References Cited

U.S. PATENT DOCUMENTS

| | | |
|---|---|---|
| 8,489,028 B2 | 7/2013 | Bhattad et al. |
| 8,554,147 B2 | 10/2013 | Bhattad et al. |
| 2003/0100311 A1 | 5/2003 | Chung et al. |
| 2003/0177374 A1* | 9/2003 | Yung et al. ............ 713/189 |
| 2007/0004423 A1 | 1/2007 | Gerlach et al. |
| 2007/0097867 A1 | 5/2007 | Kneckt et al. |
| 2007/0105574 A1 | 5/2007 | Gupta et al. |
| 2007/0105575 A1 | 5/2007 | Sampath et al. |
| 2007/0201350 A1 | 8/2007 | Papasakellariou |
| 2007/0224923 A1 | 9/2007 | Shiratani |
| 2007/0224963 A1 | 9/2007 | Moscovitz et al. |
| 2007/0280170 A1 | 12/2007 | Kawasaki |
| 2008/0043879 A1 | 2/2008 | Gorokhov et al. |
| 2008/0056183 A1 | 3/2008 | Gorokhov et al. |
| 2009/0016295 A1 | 1/2009 | Li et al. |
| 2009/0197538 A1 | 8/2009 | Borran et al. |
| 2009/0197588 A1 | 8/2009 | Khandekar et al. |
| 2010/0118719 A1 | 5/2010 | Ishii et al. |
| 2010/0173637 A1 | 7/2010 | Damnjanovic et al. |

FOREIGN PATENT DOCUMENTS

| | | |
|---|---|---|
| CN | 101009541 A | 8/2007 |
| CN | 101106391 A | 1/2008 |
| CN | 101116365 A | 1/2008 |
| CN | 101175309 A | 5/2008 |
| EP | 1047208 A1 | 10/2000 |
| EP | 1850612 A1 | 10/2007 |
| JP | 2007267281 A | 10/2007 |
| JP | 2007300505 A | 11/2007 |
| JP | 2008524913 A | 7/2008 |
| WO | 2006073271 A1 | 7/2006 |
| WO | 2006077141 A1 | 7/2006 |
| WO | 2006087797 A1 | 8/2006 |
| WO | WO-2007023787 A1 | 3/2007 |

OTHER PUBLICATIONS

Taiwan Search Report—TW098116875—TIPO—Nov. 15, 2012.

* cited by examiner

SYSTEM AND METHOD TO ENABLE RESOURCE PARTITIONING IN WIRELESS NETWORKS

CLAIM OF PRIORITY UNDER 35 U.S.C. §119

This is a continuation application of U.S. application Ser. No. 12/465,422 filed on May 13, 2009, which claims the benefit of U.S. Provisional Application Ser. No. 61/055,384, filed May 22, 2008, and entitled "SYSTEM AND METHOD TO ENABLE RESOURCE PARTITIONING IN WIRELESS NETWORKS," each of which is incorporated herein by reference in its entirety. This application is related to U.S. application Ser. No. 12/465,413, filed May 13, 2009, which is also incorporated herein by reference in its entirety.

BACKGROUND

I. Field

The present disclosure relates generally to wireless communications, and more specifically to techniques for resource and interference management in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices.

In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells.

In conventional wireless network implementations, a set of base stations are utilized to provide network coverage for respective geographic areas corresponding to the base stations. Further, power levels of respective base stations in a wireless network can differ from base station to base station, based on factors such as the relative sizes of areas covered by the base stations and/or other such factors. For example, macro base stations can be configured to cover a large area and utilize a large power class, while pico base stations and/or femto base stations can be configured to cover a smaller area and utilize lower power.

Accordingly, in a scenario in which a mobile terminal is located between two base stations of varying power levels, the mobile terminal can select a base station from the neighboring base stations to which to connect based on a variety of factors. However, in the case that the mobile terminal establishes communication with a base station having a relatively low power level, the terminal may become jammed by one or more neighboring base stations with higher power. A similar scenario can occur on the uplink, wherein a mobile terminal communicating at a relatively high level of power to a base station that is far away can cause jamming to the uplink communication of one or more base stations that are closer to the mobile terminal.

Further, in dominant interference conditions such as those described above, a regular access request transmitted by a mobile terminal to a desired serving base station can in some cases fail to be received by the base station due to uplink interference. Additionally, if the base station recognizes the regular access request and responds to it, the terminal may in some cases be unable to receive the response due to downlink interference. Accordingly, it would be desirable to implement improved initial access and/or interference management techniques for wireless networks that mitigate at least the above shortcomings with respect to dominant interference conditions.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method operable in a wireless communication system is described herein. The method can comprise identifying a communication channel utilized by a wireless communication system; detecting one or more interfering base stations; and transmitting interference reduction requests to respective detected interfering base stations over the communication channel.

A second aspect described herein relates to a wireless communications apparatus that can comprise a memory that stores data relating to a communication channel and at least one base station causing jamming to the wireless communications apparatus. The wireless communications apparatus can further comprise a processor configured to transmit respective resource clearing requests to the at least one base station over the communication channel.

A third aspect relates to an apparatus operable in a wireless communication system. The apparatus can comprise means for identifying one or more interfering Node Bs; means for identifying a communication channel designated for resource partitioning signaling; and means for transmitting resource utilization signaling to respectively identified interfering Node Bs, wherein the resource utilization signaling specifies a set of set of resources requested to be reserved by the respective interfering Node Bs.

A fourth aspect described herein relates to a computer program product, which can comprise a computer-readable medium that comprises code for causing a computer to identify a communication channel; code for causing a computer to identify one or more Evolved Node Bs (eNBs) causing interference on selected predetermined set of resources; and code for causing a computer to transmit respective resource utilization messages to identified interfering eNBs over the communication channel, wherein the reverse link resource utilization messages request clearing of the predetermined set of resources.

A fifth aspect described herein relates to a method used in a wireless communication system. The method can comprise receiving an interference reduction request from a terminal; identifying a set of downlink communication resources provided in the interference reduction request; calculating an amount of interference caused to the terminal; and reserving the set of downlink communication resources provided in the interference reduction request upon determining that the amount of interference caused to the terminal exceeds a predefined threshold.

A sixth aspect described herein relates to a wireless communications apparatus that can comprise a memory that stores data relating to a user equipment unit (UE) and a broadcast message received from the UE. The wireless communications apparatus can further include a processor configured to identify a set of downlink communication resources specified in the broadcast message, to calculate an amount of interference the wireless communications apparatus is imposing on the UE, and to set aside the set of downlink communication resources upon determining that the calculated amount of interference is greater than or equal to a threshold value.

A seventh aspect relates to an apparatus that can be utilized in a wireless communication system. The apparatus can comprise means for receiving access signaling from a terminal; means for identifying a resource set specified in the access signaling; means for calculating interference caused to the terminal by the apparatus; and means for setting aside resources in the resource set specified in the access signaling if the calculated interference meets or exceeds a threshold.

An eighth aspect described herein relates to a computer program product, which can include a computer-readable medium that comprises code for causing a computer to identify a UE and an access request message received from the UE; code for causing a computer to extract information relating to a desired set of communication resources from the access request message; code for causing a computer to determine an amount of interference imposed on the UE; and code for causing a computer to set aside the desired set of resources specified in the access request message upon determining that the determined amount of interference is greater than or equal to a predefined permissible amount of interference.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
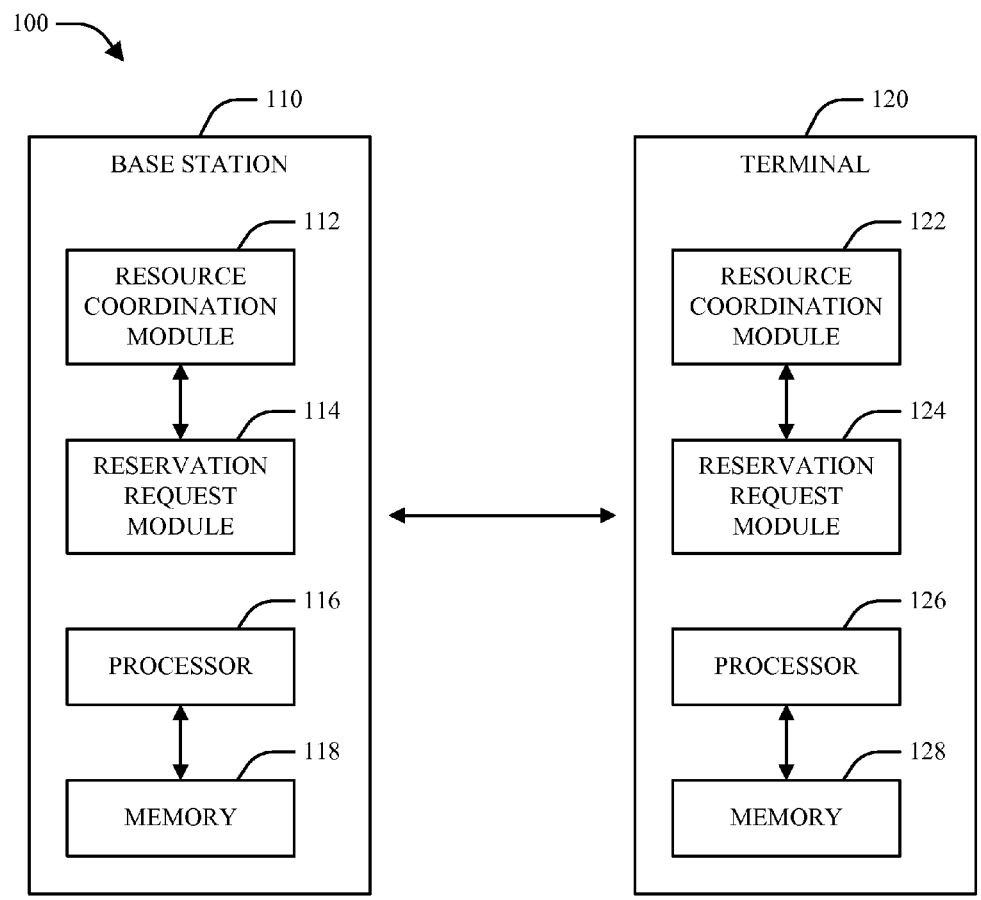
FIG. 1 is a block diagram of a system for coordinating control resources within a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for coordinating control resources within a wireless communication system in accordance with various aspects. As FIG. 1 illustrates, system 100 can include one or more base stations 110, which can communicate with one or more terminals 120b. While only one base station 110 and terminal 120 are illustrated in FIG. 1, it should be appreciated that system 100 can include any number of base stations 110 and/or terminals 120. Further, it can be appreciated that respective base stations 110 in system 100 can serve any suitable coverage area, such as an area associated with a macro cell, a femto cell (e.g., an access point base station or Home Node B (HNB)), and/or any other suitable type of coverage area.

In accordance with one aspect, terminal 120 can communicate with a base station 110 designated as a serving eNB for terminal 120. For example, terminal 120 can conduct one or more uplink (UL, also referred to as reverse link (RL)) communications to base station 110, and base station 110 can conduct one or more downlink (DL, also referred to as forward link (FL)) communications to terminal 120. In one example, uplink and/or downlink communication between terminal 120 and base station 110 can additionally result in interference to nearby base stations and/or terminals (not shown). For example, in a system with multiple base stations 110 and/or terminals 120, a terminal located in an area that lies in an overlap between the coverage of respective base stations can cause interference to one or more base stations within range of the terminal with which the terminal is not communicating and/or other terminals under various circumstances.

Figure 2:
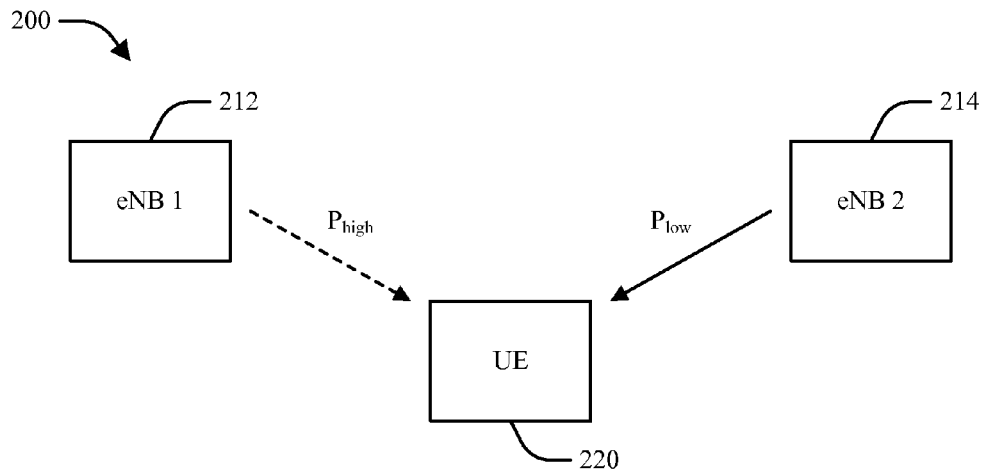
FIGS. 2-4 illustrate respective jamming scenarios in which various resource coordination techniques described herein can be implemented.
Figure 3:
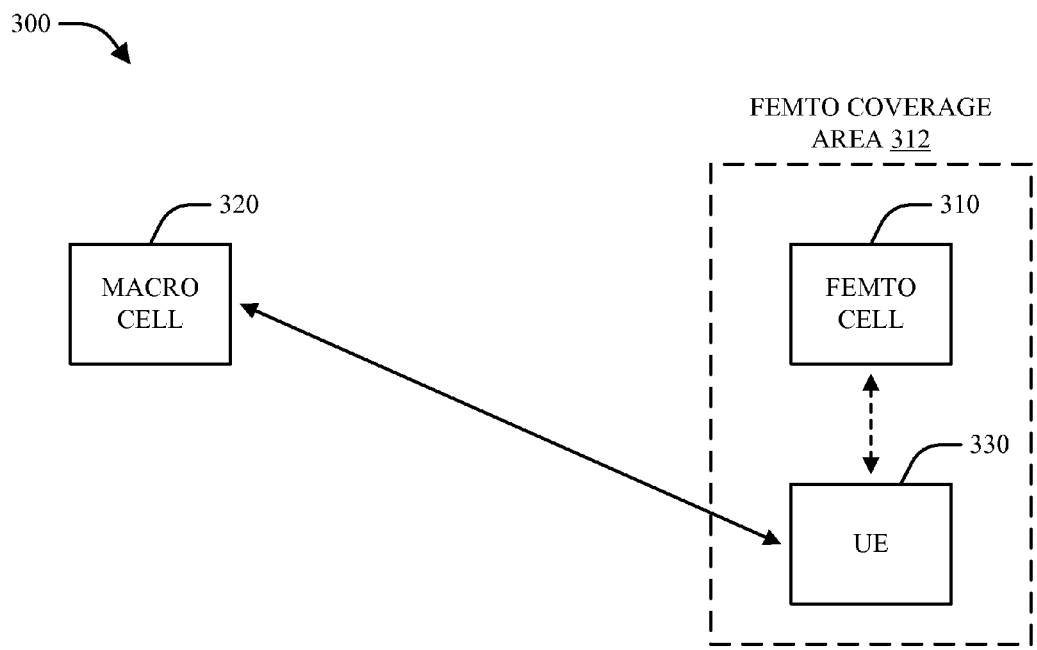
Figure 4:
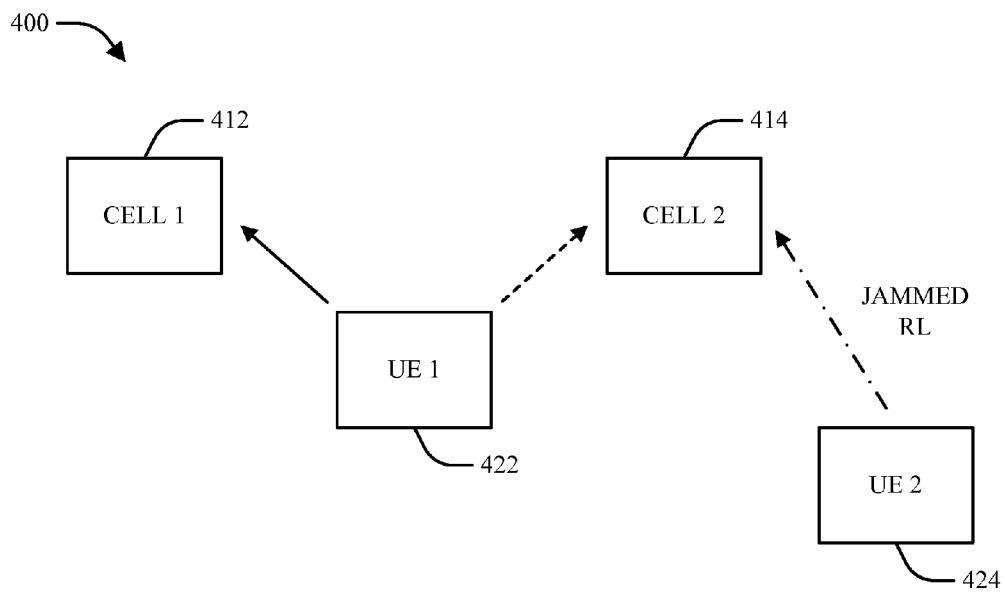

Specific examples in which the above-described interference can occur are illustrated as shown in FIGS. 2-4. Referring first to FIG. 2, a diagram of a system 200 is provided to illustrate an example interference scenario associated with range extension. As illustrated by system 200, a user equipment unit (UE) 220 can be located with respect to a set of multiple Evolved Node Bs (eNBs) 212-214 such that the coverage areas of eNBs 212-214 overlap at the location of UE 220. As further illustrated, a first eNB 212 can communicate using a relatively high rate of power (e.g., $P_{high}$), while a second eNB 214 can communicate using a lower power rate (e.g., $P_{low}$). The differences in power levels between eNBs 212 and 214 can be due to, for example, differences in configurations of the respective eNBs 212-214, different eNB classes (e.g., in the scenario where eNB 212 is a macro cell and eNB 214 is a pico or femto cell), or the like.

In one example, it can be appreciated that UE 220 can establish a connection with an eNB 212 or 214 within range of UE 220 that exhibits the least path loss. For example, on the uplink, UE 220 can connect to an eNB 214 with the lowest path loss as, for a fixed transmit power from UE 220, an eNB 214 with the lowest path loss will similarly exhibit the maximum receive power. Further, on the downlink, even if the received power from a high-power eNB 212 to UE 220 is greater than the received power from an eNB 214 with lower power, UE 220 can nonetheless elect to connect to the low-power eNB 214 in order to reduce overall system interference and/or to produce cell splitting gains, increased throughput, or other positive effects on the performance of system 200. As such a connection extends the range of weaker eNBs such as eNB 214, it is generally referred to in the art as a "range extension" or "range expansion" mode.

In accordance with one aspect as illustrated by system 200, to enable range extension, UE 220 can be required to connect to an eNB 214 whose receive power is lower than that of other eNBs 212 in system 200. Following a connection between eNB 214 and UE 220, eNB 214 can conduct one or more transmissions to UE 220, which are illustrated in FIG. 2 as a solid line. However, as UE 220 is located in the overlap of coverage area between eNBs 212 and 214, UE 220 can additionally experience interfering transmissions from eNB 212, which are illustrated in FIG. 2 as a dashed line. In one example, in the event that eNB 212 is more powerful than eNB 214, interfering transmissions from eNB 212 can jam UE 220, rendering it substantially unable to detect or decode desired transmissions from eNB 214.

A second example interference scenario that relates to network cells with restricted association is illustrated by system 300 in FIG. 3. As illustrated by FIG. 3, system 300 can include a femto cell 310 having an associated coverage area 312 and a macro cell 320 that provides coverage for an area including the coverage area 312 of femto cell 310. Further, system 300 can include a UE 330 that is located within the coverage area 312 of femto cell 310.

In one example, femto cell 310 can restrict association therewith such that, for example, UE 330 is not permitted to connect to femto cell 310. In such a case, UE 330 can be required to connect to macro cell 320 that serves the location of UE 330 rather than femto cell 310. However, such a scenario can result in both uplink jamming of femto cell 310 and downlink jamming of UE 330. More particularly, communications between macro cell 320 and UE 330, which are illustrated in FIG. 3 by a solid line, can cause jamming and/or interference to the uplink of femto cell 310, and communications between femto cell 310 and UEs served by femto cell 310 can cause interference and/or jamming to the downlink of UE 330 due to the fact that the observed signal strength of femto cell 310 at the location of UE 330 can be significantly larger than that of macro cell 320. Such interference between femto cell 310 and UE 330 is illustrated in FIG. 3 as a dashed line.

A third example interference scenario is illustrated by system 400 in FIG. 4, which relates to uplink interference that can be experienced at a femto cell and/or one or more other cells 414 in an associated network. In the example illustrated by system 400, a set of multiple network cells 412-414 can provide coverage for a geographic area that includes the location of a given UE 422. In one example, UE 422 can establish a connection with a first network cell 412 such that UE 422 can conduct one or more transmissions to cell 412, which are illustrated in FIG. 4 as a solid line. However, as UE 422 is also within the area served by cell 414 in system 400, it can be appreciated that communications from UE 422 to cell 412 can additionally cause interference at cell 414, which is illustrated in FIG. 4 as a dashed line. Such interference can, in turn, jam cell 414 on the reverse link such that other UEs 424 served by cell 414 are unable to connect to cell 414. The extent to which cell 414 is jammed by interfering transmissions from UE 422 can be based on, for example, the relative power level of UE 422, relative distances of UE 422 and other UEs 424 from cell 414, and/or other factors.

Returning to FIG. 1, in view of the interference scenarios illustrated by FIGS. 2-4 and/or any other applicable causes of interference, respective entities in system 100 can in accordance with one aspect engage in resource coordination to mitigate interference experienced within system 100. To these ends, base station 110 can include a resource coordination module 112, which can operate to coordinate control resource usage between base station 110 and terminal 120 to mitigate the effects of interference between entities in system 100. Similarly, terminal 120 can include a resource coordination module 122 for interference management and/or other suitable purposes. In one example, if base station 110 and terminal 120 are configured to utilize overlapping sets of control resources in time (e.g., subframes, interlaces, etc.), frequency (e.g., sub-bands, etc.), code, or the like, resource coordination modules 112 and/or 122 at base station 110 and/or terminal 120, respectively, can facilitate coordination between the overlapping control resources such that transmissions conducted over the overlapping resources from one entity in system 100 do not interfere with communication at another nearby entity. Specific techniques that can be utilized for resource coordination are provided in further detail infra.

In accordance with one aspect, resource coordination modules 112 and/or 122 can facilitate resource partitioning via, for example, splitting of resources in time, frequency, etc., between entities in system 100. In one example, resource coordination module 112 at base station 110 can act in cooperation with a reservation request module 114, which can request one or more interfering entities to be silent in particular frequency sub-bands, subframes or interlaces in time, etc., on which base station 110 expects to receive information from terminals 120 and/or other entities within system 100. Similarly, terminal 120 can include a reservation request module 124 that can act in cooperation with resource coordination module 122 to request interfering entities in system 100 to be silent on frequency sub-bands, subframes or interlaces in time, and/or other resources over which terminal 120 expects to receive information. Accordingly, by way of specific, non-limiting example, resource coordination module 122 and/or reservation request module 124 at terminal 120 can be utilized to enable terminal 120 to establish a connection with a serving base station in the presence of other interfering base stations. In another example, resource coordination module 112 and base station 110 and/or resource coordination module 122 at terminal 120 can be utilized to coordinate usage of control resources and/or data resources between base station 110 and terminal 120. Techniques that can be utilized by terminal 120 for selecting a base station 110 with which to communicate, determining resources to be cleared in connection with communicating with the selected base station 110, and the like are described in further detail infra.

In one example, base station 110 and/or terminal 120 can coordinate resource usage between respective entities in system 100 by communicating Resource Utilization Messages (RUMs) to various entities in system 100. For example, base station 110 can submit a FL Special RUM (F-SRUM) to one or more terminals 120 to request reservation (e.g., clearing or setting aside) of resources, and terminal 120 can request resource reservation by submitting a RL Special RUM (R-SRUM) to one or more base stations 110 in system 100. In one example, a RUM can specify resources to be reserved by a receiving entity, and the receiving entity can in turn reserve the specified resources in response to the message. Alternatively, a RUM can include a general request for resource reservation, based on which a receiving entity can reserve a predetermined amount of resources.

In accordance with one aspect, base station 110 and terminal 120 can exchange RUMs in association with the establishment of communication between base station 110 and terminal 120 in the following manner. It should be appreciated, however, that the following description is provided by way of example and not limitation and that, unless explicitly stated otherwise, the claims are not intended to be limited to such an example. In particular, to enable a connection with a desired base station 110, terminal 120 can transmit an Access Request command to the base station 110 to schedule transmissions over a particular set of resources. Additionally or alternatively, terminal 120 can convey an R-SRUM to other base stations (not shown) that are causing interference in the requested resources to request that the other base stations clear the desired resources. It can be appreciated that terminal 120 can utilize a R-SRUM in this manner due to the fact that the desired base station 110 is to transmit messages to terminal 120 in the configured resources and that, if other base stations transmit using the same resources with higher power than the desired base station 110, terminal 120 can be rendered unable to recover the transmissions from base station 110. Accordingly, the use of R-SRUMs in this manner can establish a clean downlink channel for transmission from a desired base station 110 to terminal 120.

Additionally or alternatively, a base station 110 that receives an Access Request command from a terminal 120 for a particular subband and/or set of resources can subsequently transmit an F-SRUM requesting other terminals causing significant interference in the corresponding resources to clear those resources. Accordingly, it can be appreciated that the use of F-SRUMs by base station 110 can provide a clean uplink channel for terminal 120 to send messages to base station 110. Specific techniques for transmitting Access Request, R-SRUM, F-SRUM messages are illustrated and described in the description and related drawings that follow.

In one example, terminal 120 can transmit respective Access Request commands and/or R-SRUMs to base station 110 over a Physical Uplink Control Channel (PUCCH), a Physical Uplink Shared Channel (PUSCH), a Sounding Reference Signal (SRS), a Physical Random Access Channel (PRACH), a Low Reuse Access (LRA) channel, and/or any other suitable channel. In another example, base station 110 can transmit one or more F-SRUMs to terminal 120 using a Primary Broadcast Channel (PBCH), a Physical Downlink Control Channel (PDCCH), a Physical Downlink Shared Channel (PDSCH), a Physical Hybrid ARQ (Automatic Repeat Request) Indicator Channel (PHICH), a System Information Block (SIB), a Primary Synchronization Sequence (PSS), a Secondary Synchronization Sequence (SSS), a preamble channel such as a Low Reuse Preamble (LRP) channel or the like, and/or any other suitable channel. In addition, it can be appreciated that any suitable signaling type, such as Layer 1 (L1) signaling, Layer 3 (L3) signaling, or the like, can be utilized by base station 110 and/or terminal 120 in transmitting respective Access Request commands, R-SRUMs, and/or F-SRUMs as described herein.

In accordance with another specific example, terminal 120 can utilize a preamble message, such as a Low Reuse Preamble (LRP) message and/or another suitable mechanism, to identify respective base stations 110 within range of terminal 120. Based on this determination, terminal 120 can identify a base station 110 to which to connect and/or other base stations 110 that are causing interference. Subsequently, terminal 120 can submit an Access Request command to the desired base station 110 and R-SRUM messages to base stations 110 identified as causing interference.

In accordance with one aspect, base stations 110 in system 100 communicate with their respectively served terminals and are not configured with resources to communicate with a given terminal 120 prior to submission of an Access Request. Similarly, terminals 120 in system 100 are not configured with resources to be utilized for communication with respective non-serving base stations 110. Accordingly, in one example a clean channel can be established within system 100 that is utilized exclusively for access requests and/or resource reservation requests. A clean channel can be established, for example, by dedicating part of the system bandwidth to an access channel such that the dedicated portion is used exclusively for access requests and/or reservation requests. In one example, such resources can be cleared by all base stations 110 and/or terminals 120 that allow communication in such dominant interference conditions. Accordingly, base stations 110 and/or terminals 120 in system 100 can be configured to monitor the dedicated resources for access requests, resource requests, or other messages.

By way of specific example, information relating to resources on which access request and/or resource reservation request signaling can be transmitted can be obtained by terminals 120 in system 100 over one or more communication channels such as, for example, PDCCH, SIB(s), PBCH, LRP, and/or any other suitable channel(s). Further, it can be appreciated that one or more channels utilized by a terminal 120 in obtaining information relating to resources on which access request and/or resource reservation request signaling can be transmitted can be configured as global channels such that the terminal 120 can obtain the necessary information from any suitable base station 110 in system 100, including base stations other than a base station 110 with which terminal 120 desires to connect. In another specific example, respective base stations 110 can reserve one or more PUCCH resource blocks (RBs) (e.g., at the edge of the system frequency band and/or at any other appropriate resource location) for reception of R-SRUM and/or Access Request messages. Additionally or alternatively, clean resources for Access Request and/or R-SRUM transmission can be obtained by reserving PUSCH resources. Further, on the downlink, it can be appreciated that clean resources for resource utilization signaling can be obtained via scheduling of PDSCH resources by respective base stations 110 such that no control and/or data transmissions are conducted to and/or from respective terminals 120 on the scheduled resources.

In accordance with another aspect, base stations 110 and/or terminals 120 in system 100 can be configured to re-transmit information over a dedicated clean channel in the event that multiple messages collide at a given time, a message fails to be properly received by its intended recipient, and/or due to other suitable causes. Retransmission can be performed at intervals in time according to a time reuse pattern, which can be uniform and/or time-varying. In one example, time reuse can be triggered at a terminal 120 when a desired base station 110 fails to schedule terminal 120 due to lack of resources and/or other causes. Thus, for example, terminal 120 can be configured to re-transmit an access request upon expiration of a predetermined period of time if scheduling of the terminal 120 has not occurred.

In accordance with another aspect, one or more base stations 110 and/or terminals 120 in system 100 can coordinate communication resources with the aid of an external system controller (not shown), which can be, for example, a management server or entity for system 100 and/or one or more areas within system 100. In one example, such a system controller can be a Home Node B (HNB) Management Server (HMS) and/or another suitable entity, which can coordinate the use of one or more channels within a given area (e.g., a neighborhood). In another example, a standalone system controller can communicate with base stations 110 and/or terminals 120 in system 100 via backhaul messaging and/or by any other suitable means.

As further illustrated in system 100, base station 110 can include a processor 116 and/or a memory 118, which can be utilized to implement some or all of the functionality of resource coordination module 112, reservation request module 114, and/or any other component(s) of base station 110. Similarly, FIG. 1 illustrates that terminal 120 can include a processor 126 and/or memory 128 to implement some or all of the functionality of resource coordination module 122, reservation request module 124, and/or any other component(s) of terminal 120.

Figure 5:
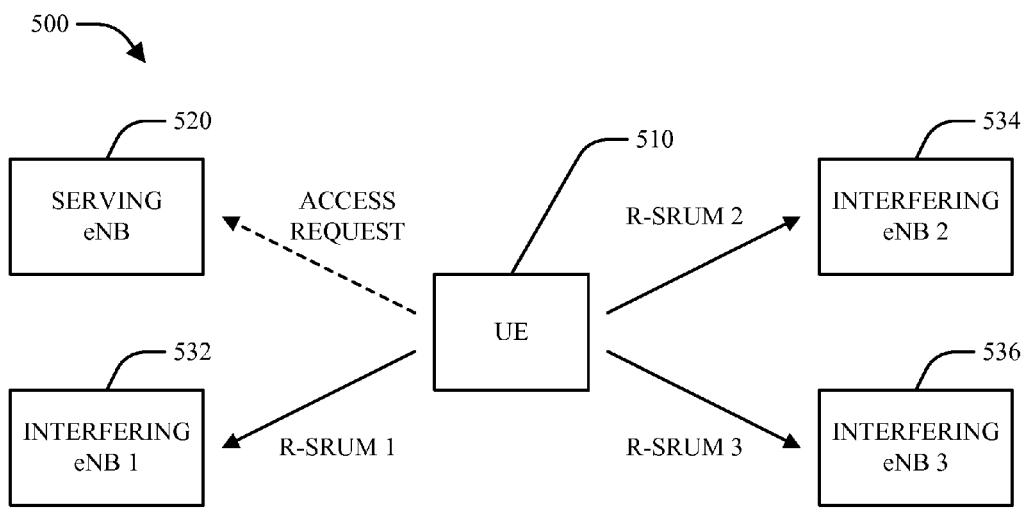
FIG. 5 is a block diagram of a system for utilizing unicast messages for downlink resource coordination in accordance with various aspects.

Turning now to FIG. 5, a block diagram of an example system 500 for utilizing unicast messages for downlink resource coordination in accordance with various aspects is illustrated. As shown in FIG. 5, system 500 can include a UE 510, which can be located in the presence of a desired serving eNB 520 as well as one or more neighboring eNBs 532-536 that are causing interference to UE 510. As further shown in FIG. 5, R-SRUM messages can be transmitted in a unicast fashion, such that an access request is provided to a desired serving eNB 520 and individually tailored R-SRUMs are transmitted to respective interfering eNBs 532, 534, and 536. In one example, respective R-SRUMs provided to corresponding eNBs 532-536 can include an identity of an intended eNB, particular resources to be vacated, and/or other suitable information.

In accordance with one aspect, unicast R-SRUMs as shown in system 500 can be transmitted over a channel specifically reserved for R-SRUMs and/or a legacy channel (e.g., a Physical Random Access Channel (PRACH)). In one example, to transmit information to interfering eNBs 532-536 on legacy channels, UE 510 can in some cases be required to obtain system parameters, such as bandwidth parameters or the like, by listening to signals transmitted by respective eNBs 532-536. UE 510 may, in some cases, not be able to obtain parameters relating to all interfering eNBs 532 simultaneously. Thus, in one example, a multi-stage technique can be employed for obtaining channel information and submitting respective R-SRUMs as illustrated by FIG. 6.

Figure 6:
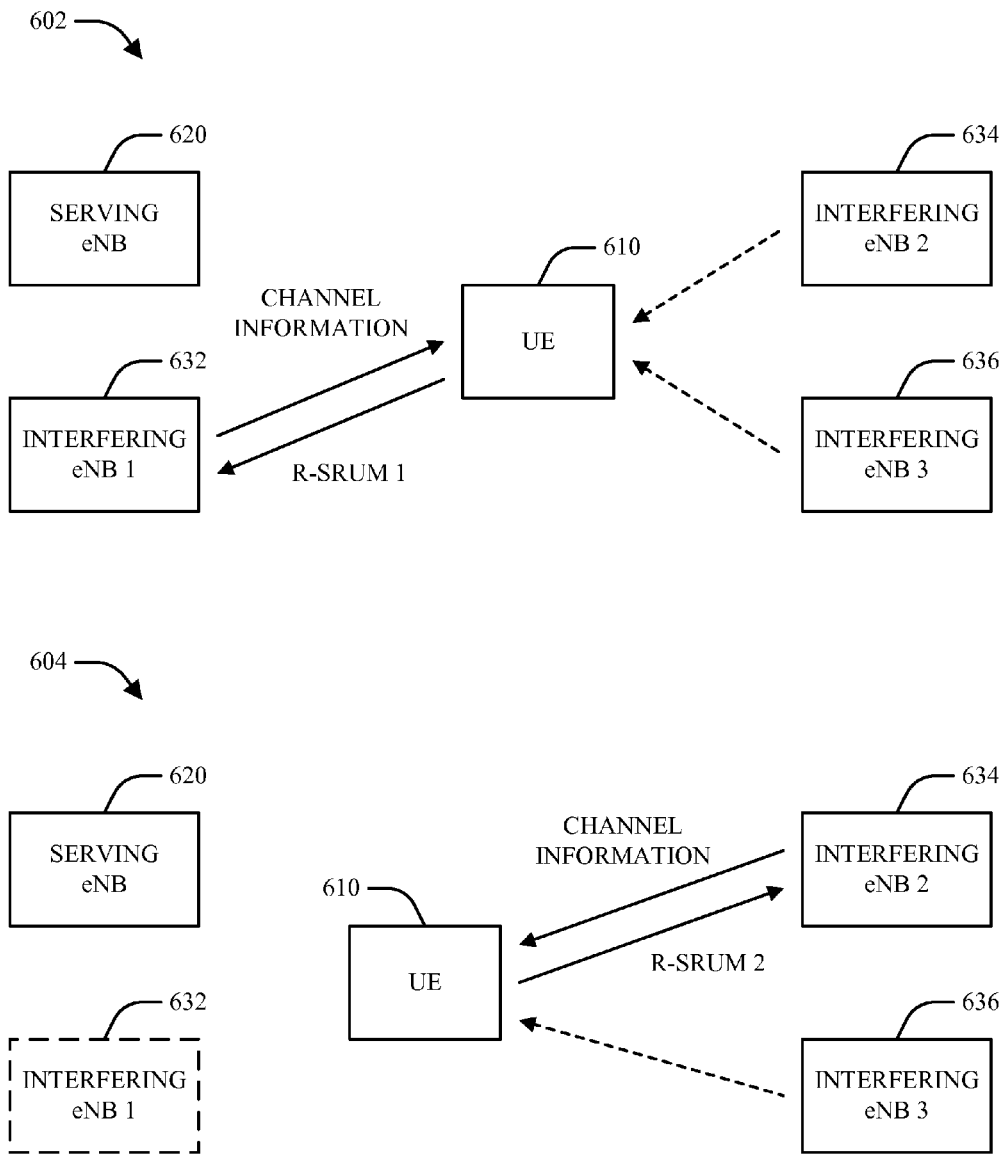
FIG. 6 illustrates a technique for performing incremental downlink resource coordination in accordance with various aspects.

As FIG. 6 illustrates, a UE 610 in the presence of a serving eNB 620 and multiple interfering eNBs 632-636 can obtain channel information relating to an eNB 632 to which UE 610 is able to connect as illustrated in diagram 602. An eNB 632 to which UE 610 initially extracts channel parameters can, but need not, be an eNB 632 that generates the strongest interference observed at UE 610. Based on extracted channel information, UE 610 can submit an R-SRUM to eNB 632 to cause eNB 632 to set aside a predefined set of resources. Subsequent to eNB 632 reserving the defined resources, UE 610 can extract channel parameters from one or more other eNBs 634 and transmit corresponding R-SRUMs as illustrated by diagram 604. In one example, a subsequent eNB 634 with which UE 610 communicates can, but need not, be the eNB that produces the strongest interference as observed at UE 610 following reservation of resources by a previous strongest interfering eNB 632. In one example, the process illustrated by diagrams 602-604 can subsequently continue for additional eNBs (e.g., eNB 636 and/or other eNBs in system 600) in order to enable UE 610 to request resource reservation at all eNBs 632-636 causing higher than a threshold amount of interference to UE 610.

Returning to FIG. 5, unicast R-SRUM messaging can additionally or alternatively be conducted by, for example, utilizing a clean channel that can be utilized by any UE(s) 510 and/or other entities in system 500 to transmit R-SRUM messaging. In one example, a clean channel used for R-SRUM messaging can be specifically allocated for R-SRUMs, configured to coincide with a channel reserved for Access Request messaging and/or other similar types of messaging, and/or allocated in any other suitable manner. For example, as illustrated by diagram 700 in FIG. 7, preamble messages, such as LRP messages 712-716, can be transmitted by respective eNBs on downlink bandwidth 702 associated with a Low Reuse Preamble (LRP) channel and/or any other suitable preamble channel reserved for preamble messages such as LRP messages 712-716. Further, Access Request commands 722 to a desired eNB and/or R-SRUMs 724-726 to one or more interfering eNBs can be transmitted by one or more UEs on uplink bandwidth 704 such that the timing of messages 722-726 are tied to the timing of LRPs 712-716 transmitted by corresponding eNBs on downlink bandwidth 702 to increase efficiency and R-SRUM detection accuracy.

In one example, a unicast Access Request or R-SRUM message intended for a given eNB can be transmitted at a predetermined time period on uplink bandwidth 704 following an LRP transmitted by the eNB on downlink bandwidth 702. For example, diagram 700 illustrates that following a LRP 712 communicated by eNB 0, an Access Request 722 intended for eNB 0 can be transmitted on uplink bandwidth 704 at a predetermined period of time following the LRP 712. Similarly, an R-SRUM 724 intended for interfering eNB 1 can be transmitted using uplink bandwidth 704 at a predetermined amount of time following an LRP 714 provided by eNB 1. Accordingly, it can be appreciated that respective base stations can be configured to scan for Access Request and/or R-SRUM messaging at limited segments in time following transmission of a LRP, thereby reducing the amount of resources required for R-SRUM detection and reducing the probability of detecting an R-SRUM falsely. In one example, a predetermined amount of time between transmission of an LRP and a corresponding R-SRUM can be uniform for all entities within an association system or can vary with time and/or from entity to entity. In another example, Access Request messaging and R-SRUM messaging can be conducted on the same channel, such as the channel illustrated by diagram 700, or on different channels.

In a further example, Access Request messages and/or R-SRUMs can be configured for retransmission over uplink bandwidth 704 in the event that a collision occurs between such messages transmitted by multiple respective UEs and/or any other failure event that prevents a response to a transmitted message from being received by its intended recipient.

Figure 8:
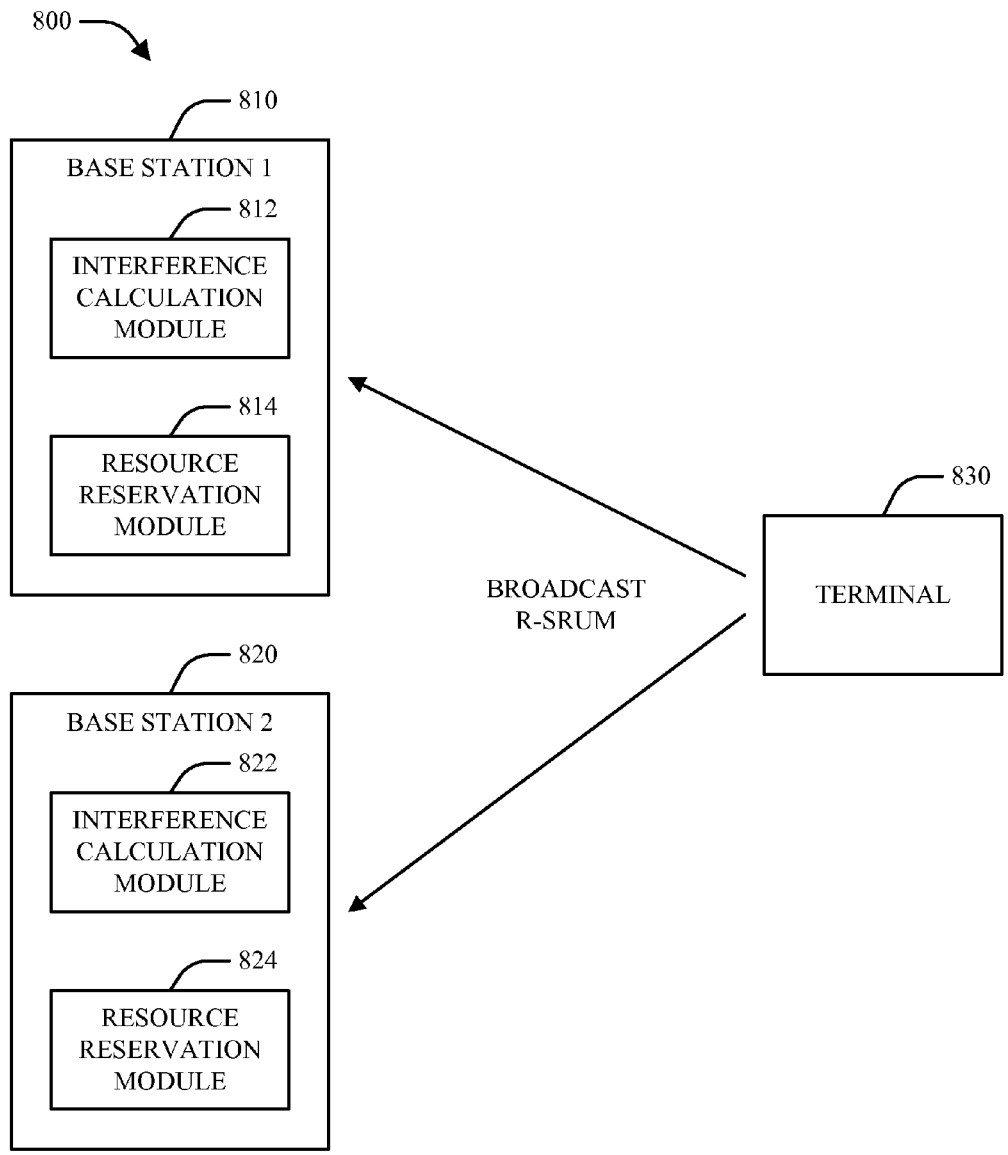
FIG. 8 is a block diagram of a system for utilizing broadcast messages for downlink resource coordination in accordance with various aspects.

Turning now to FIG. 8, a block diagram of a system 800 for utilizing broadcast messages for downlink resource coordination in accordance with various aspects is illustrated. As illustrated by system 800, a set of base stations 810 and/or 820 can provide coverage for a geographical area that includes a terminal 830. In accordance with one aspect, in the event that one or more base stations 810 and/or 820 are causing interference to terminal 830, terminal 830 can submit an R-SRUM to base stations 810 and 820 in a broadcast fashion. In accordance with one aspect, the broadcast R-SRUM can be submitted as part of an Access Request message.

Figure 7:
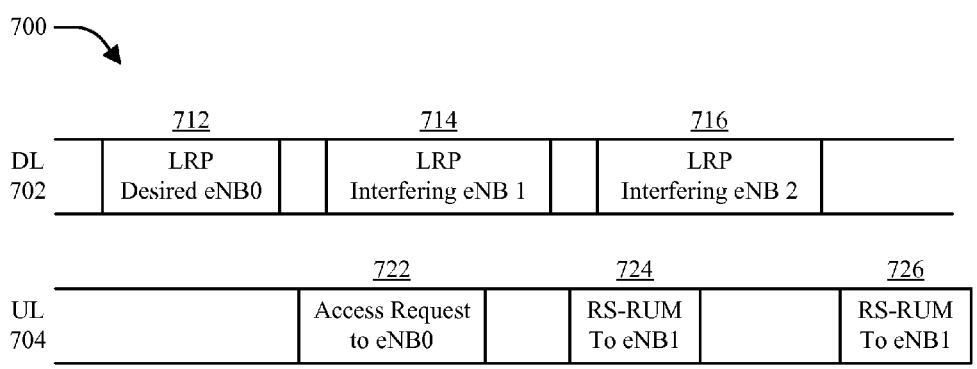
FIG. 7 illustrates a technique for timing resource coordination messaging in accordance with various aspects.

In contrast to the unicast R-SRUM messaging techniques illustrated by FIGS. 5-7, it can be appreciated that a broadcast R-SRUM as transmitted by terminal 830 can be generalized for multiple base stations 810 and 820 within range of 830. Thus, for example, a broadcast R-SRUM can include information such as the identity of a desired serving base station, a transmit power at which the R-SRUM is transmitted, subband indexes and/or other information relating to desired resources, or the like. Upon receipt of a broadcast R-SRUM at a base station 810 and/or 820, the base station 810 and/or 820 can utilize an interference calculation module 812 and/or 822 to determine whether it is causing at least a threshold level of interference to terminal 830. For example, interference calculation module 812 and/or 822 can measure a power level at which the R-SRUM was received and compare the measured power level to the transmit power level provided in the R-SRUM to calculate the path loss from terminal 830 to the corresponding base station 810 and/or 820. Based on this information, interference calculation module 812 and/or 822 can determine an extent to which its corresponding base station 810 and/or 820 is interfering with terminal 830. If the determined interference is at least a threshold value, a corresponding resource reservation module 814 and/or 824 can be utilized to set aside the resources specified in the R-SRUM.

Thus, in accordance with one aspect, it can be appreciated that the unicast R-SRUM mechanisms illustrated by FIGS. 5-7 and the broadcast R-SRUM mechanisms illustrated by FIG. 8 can differ in the entity that calculates interference caused to terminal 830. More particularly, as described herein, interference calculation can be performed terminal-side in the case of unicast R-SRUM and network-side in the case of broadcast R-SRUM.

Figure 9:
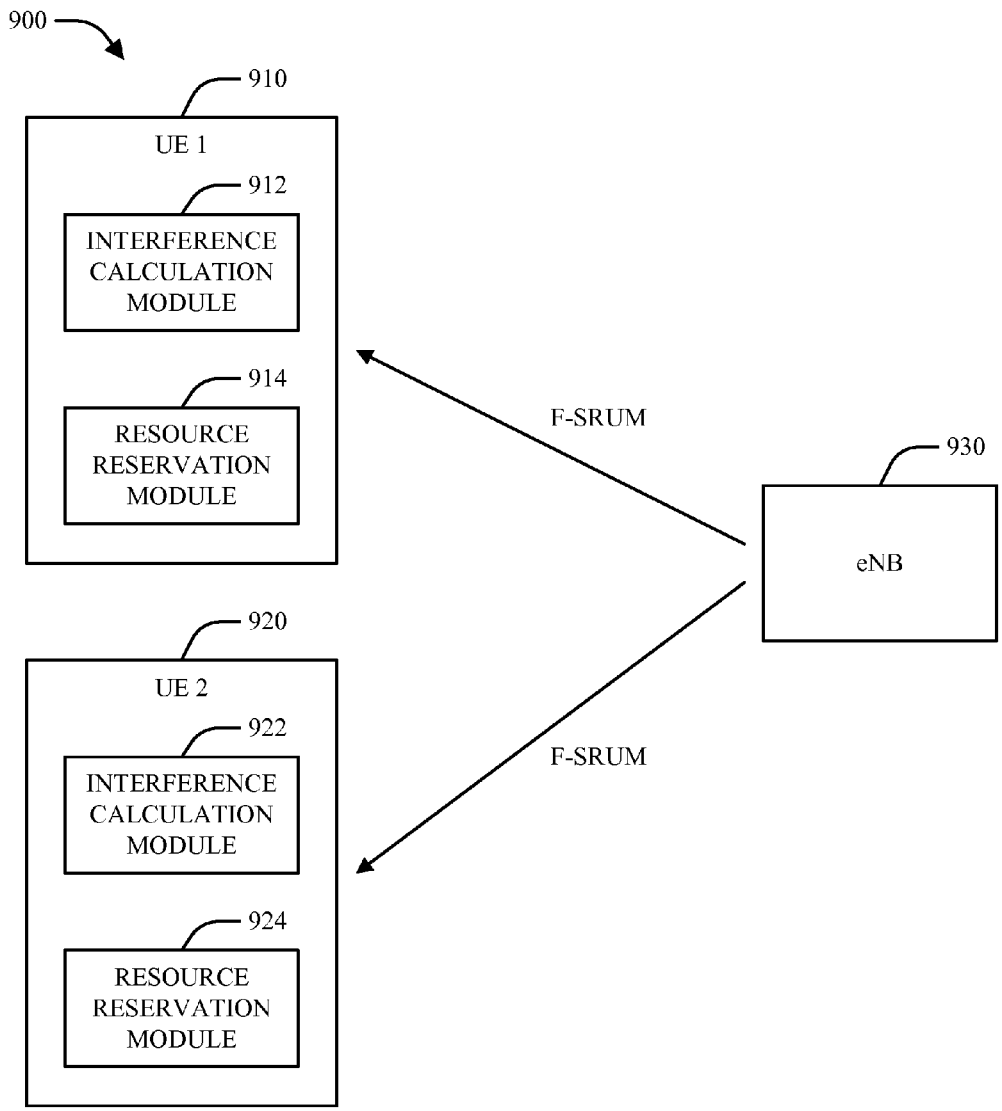
FIG. 9 is a block diagram of a system for conducting uplink resource coordination in accordance with various aspects.

Turning next to FIG. 9, a system 900 for conducting uplink resource coordination in accordance with various aspects is illustrated. In accordance with one aspect, system 900 can include respective UEs 910 and/or 920 that can be located within the coverage area of an eNB 930. In one example, in the event that eNB 930 does not provide communication service to UEs 910 and/or 920, one or more UEs 910 and/or 920 can, in some cases, cause interference or jamming to eNB 930 on the uplink (e.g., as shown above with regard to FIG. 4). Thus, to manage the level of interference observed at eNB 930, eNB can broadcast F-SRUM messaging to one or more UEs 910 and/or 920 in order to cause interfering UEs 910 and/or 920 to set aside given resources in order to allow eNB 930 to communicate to its associated UEs.

In one example, F-SRUM communication can be conducted in a similar manner to the broadcast R-SRUM communication illustrated by system 800. More particularly, eNB 930 can broadcast a F-SRUM to UEs 910 and/or 920 that includes the transmit power used to transmit the F-SRUM, specific resources desired for use, and/or other information. Upon receiving a F-SRUM, respective interference calculation modules 912 and/or 922 can determine an extent to which their respectively associated UEs 910 and/or 920 are interfering with eNB 930 based on information in the F-SRUM. This can be done by, for example, comparing a transmit power specified in the F-SRUM to a power at which the F-SRUM is received. Upon determining that the UE 910 and/or 920 is causing at least a predetermined amount of interference to eNB 930, a resource reservation module 914 and/or 924 can set aside some or all of the resources desired by eNB 930.

Figure 10:
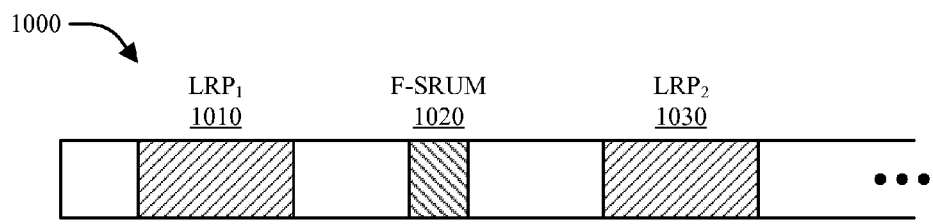
FIG. 10 illustrates a technique for timing resource coordination messaging in accordance with various aspects.

In accordance with another aspect, F-SRUM messaging can be conducted by eNB 930 on a downlink channel allocated for preamble transmission. By way of specific example as shown by diagram 1000 in FIG. 10, F-SRUM messaging can be conducted over downlink resources allocated for a preamble channel, such as, for example, an LRP channel. In one example, a preamble channel can be configured as a common channel within a communication system that is utilized by respective base stations in order to aid UEs in identifying neighboring base stations. By way of example, respective base stations in an associated communication system can transmit corresponding LRP messages 1010 and/or 1030, which can be detected by a UE in order to aid the UE in discovering the respective base stations. In one example, LRP messages 1010 and/or 1030 can be transmitted at random intervals on an associated LRP channel in order to reduce the likelihood of continued collisions between LRP messages 1010 and 1030 from different base stations.

In one example, respective base stations in an associated communication system can further be configured to transmit F-SRUM messages 1020 on the LRP channel with time reuse in addition to the LRP messages 1010 and/or 1030. In an alternative example, base stations can integrate F-SRUM information into respective LRP messages 1010 and/or 1030 such that respective UEs are configured to obtain information corresponding to an F-SRUM within one or more corresponding LRP messages 1010 and/or 1030.

In an alternative example, F-SRUM messaging can be embedded in one or more LRP messages 1010 and/or 1030 by, for example, including a parameter in the respective LRP messages 1010 and/or 1030 that indicates whether the corresponding base station is loaded. By way of specific example, a 1-bit loading indicator can be utilized within a LRP message 1010 and/or 1030. In such an example, when an LRP message 1010 and/or 1030 indicates loading, respective interfering UEs can be configured to clear respective resources that the base station that transmitted the LRP message 1010 and/or 1030 will need to establish a connection with one or more of its served UEs. Alternatively, if the LRP message 1010 and/or 1030 does not indicate loading, the UEs can be configured to continue using the respective resources. In one example, respective UEs can determine if they are interfering with a base station corresponding to an LRP message 1010 and/or 1030 based on the power measured on the LRP message 1010 and/or 1030 or by any other suitable means.

Figure 11:
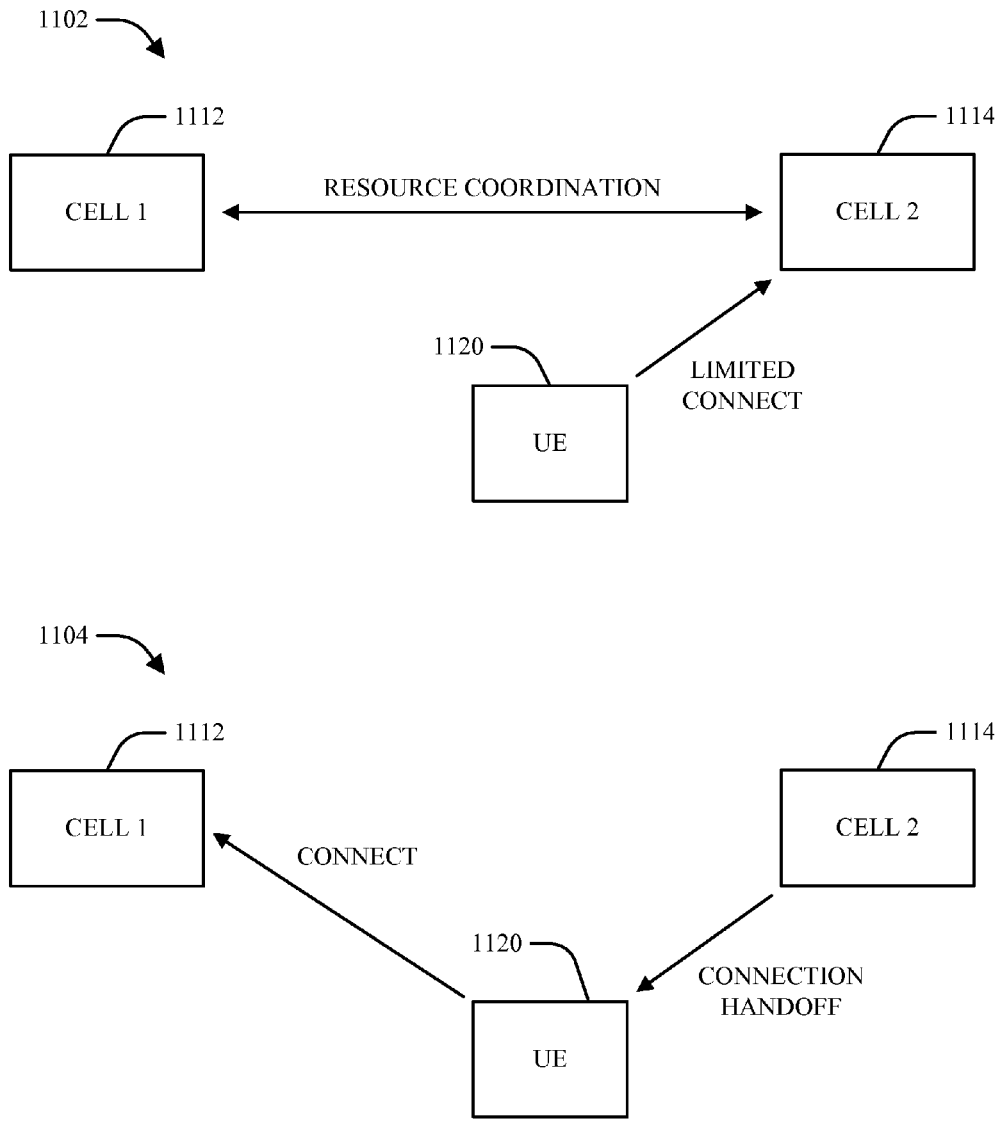
FIG. 11 illustrates a technique for connecting to a network cell via an intervening cell in accordance with various aspects.

Turning next to FIG. 11, a set of diagrams 1102-1104 are provided that illustrate a technique for connecting to a network cell via an intervening cell in accordance with various aspects. In one example, a system as illustrated by FIG. 11 can include a set of network cells 1112 and 1114, each of which can be located within communication range of a UE 1120. In accordance with one aspect, UE 1120 may observe a power level from a first cell 1112 that is lower than that from a second cell 1114 due to, for example, relative distances from the cells 1112 and 1114, differing cell types (e.g., macro, pico, or femto cell), or the like. However, due to range extension, access restrictions, and/or other reasons, UE 1120 can in some cases be configured to connect to a cell 1112 with a relatively low observed power level. Such a connection can result in interference, as generally described above. Further, in some cases, UE 1120 may lack the processing power or capability to coordinate resources between the respective cells 1112 and 1114 in order to mitigate such interference.

Accordingly, in one example UE 1120 can initially connect to a non-serving cell 1114 for the limited purpose of facilitating resource coordination, as shown in diagram 1102. Upon connection between cell 1114 and UE 1120, cell 1114 can communicate with cell 1112 over the backhaul and/or by other suitable means to coordinate resource usage between cells 1112 and 1114 to mitigate interference caused to UE 1120. Subsequent to resource coordination as illustrated by diagram 1102, the non-serving cell 1114 for UE 1120 can facilitate a handoff to the serving cell 1112. By way of specific example, the procedure illustrated by FIG. 11 can be conducted in a scenario in which cell 1114 is a restricted femto cell, cell 1112 is a macro cell, and UE 1120 is barred from connecting to cell 1114. In such an example, the procedure illustrated by FIG. 11 can be utilized to enable UE 1120 to receive access privileges from a femto cell 1114 to which UE 1120 has been barred for the limited purpose of negotiating a handoff to macro cell 1112.

Referring now to FIGS. 12-18, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 12:
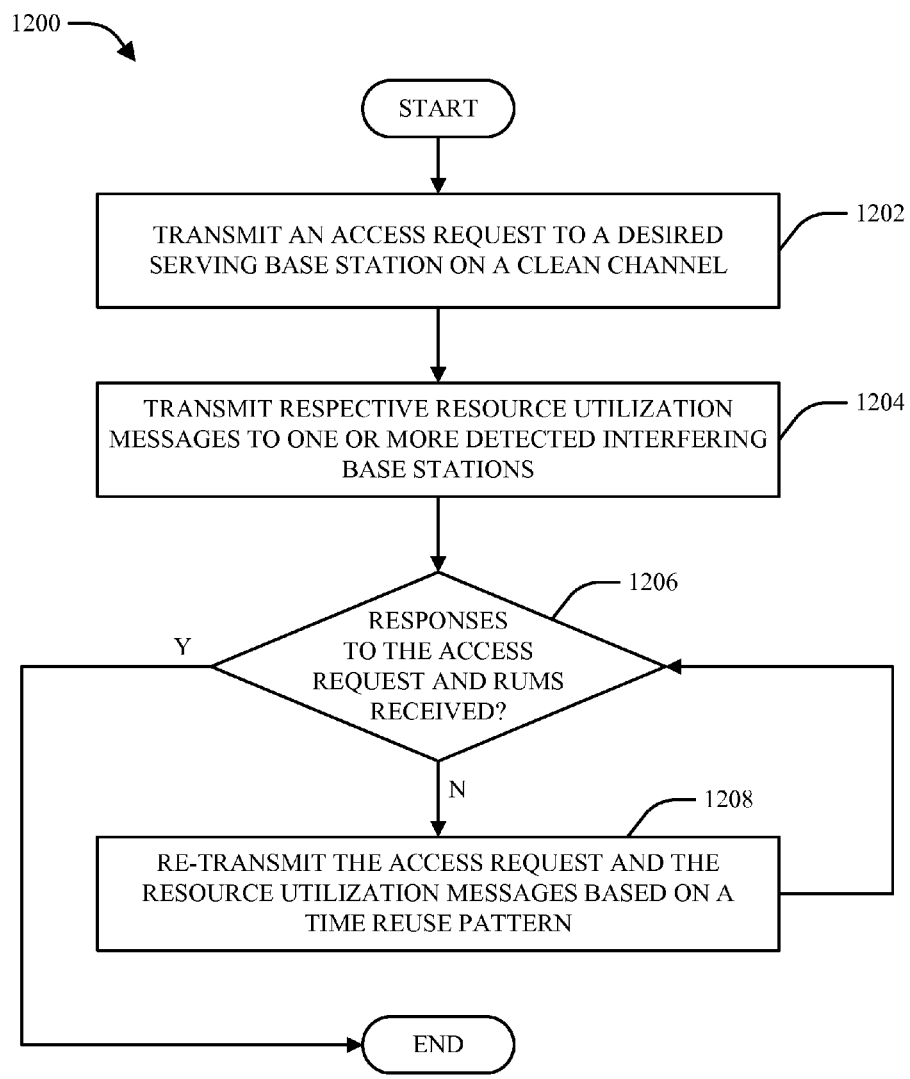
FIGS. 12-14 are flow diagrams of respective methodologies for unicast messaging for downlink resource partitioning in a wireless communication system.

With reference to FIG. 12, illustrated is a methodology 1200 for unicast messaging for downlink resource partitioning in a wireless communication system (e.g., system 500). It is to be appreciated that methodology 1200 can be performed by, for example, a terminal (e.g., UE 510) and/or any other appropriate network device. Methodology 1200 begins at block 1202, wherein an access request is transmitted to a desired serving base station (e.g., serving eNB 520) on a clean communication channel. Next, methodology 1200 can proceed to block 1204, wherein respective RUMs are transmitted to one or more detected interfering base stations (e.g., interfering eNBs 532-536). In one example, the access request transmitted at block 1202 and the RUMs transmitted at block 1204 can utilize time reuse such that, at block 1206, it is determined whether responses to the access request and the RUMs are received. If responses to the access request and the RUMs have not been received, methodology 1200 can proceed to block 1208, wherein the access request and the RUMs are re-transmitted based on a time reuse pattern, after which the determination at block 1206 can repeat. Otherwise, methodology 1200 can conclude.

Figure 13:
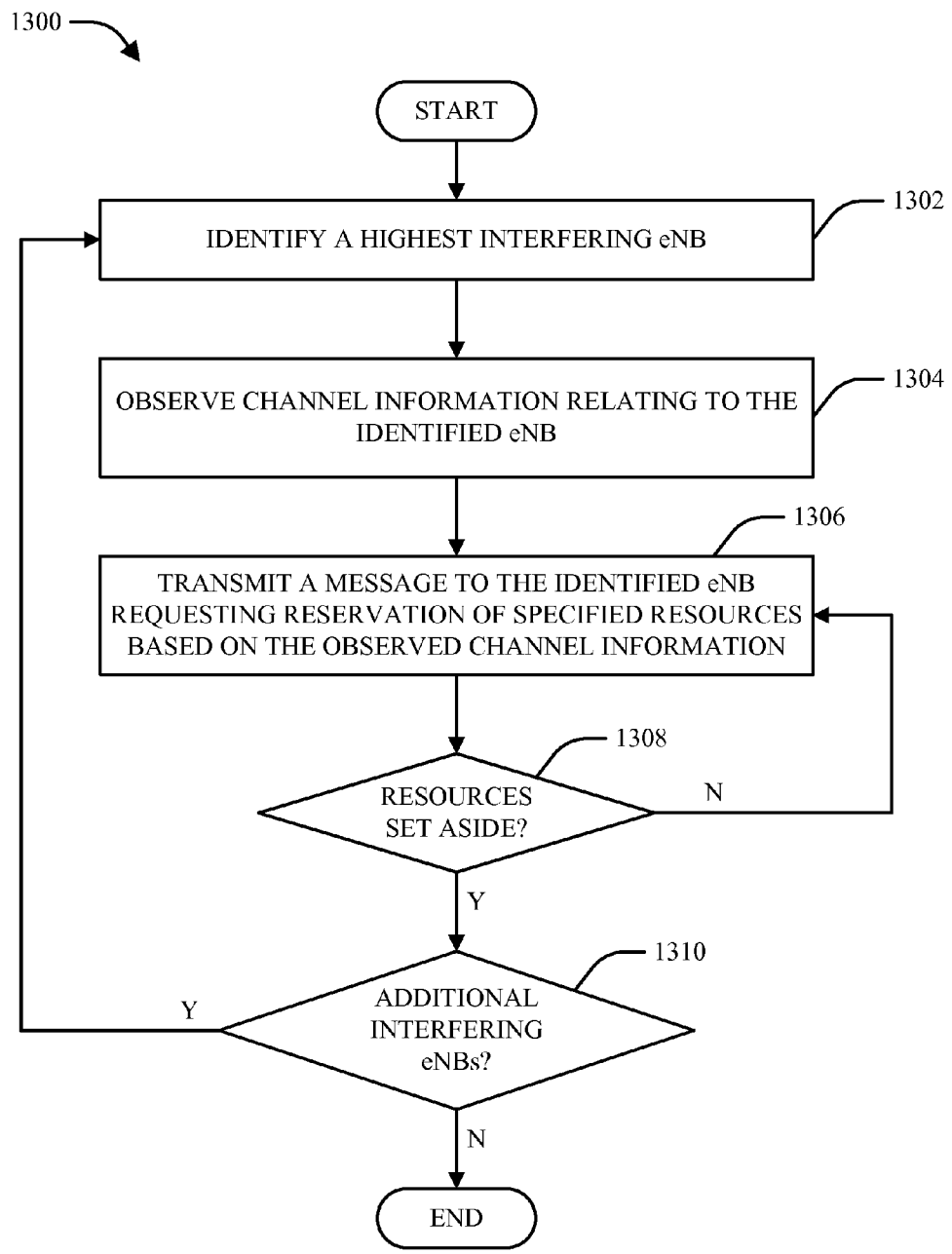

FIG. 13 illustrates another methodology 1300 for utilizing unicast messaging for downlink resource partitioning in a wireless communication system. Methodology 1300 can be performed by, for example, a terminal (e.g., UE 610) and/or any other appropriate network device. Methodology 1300 begins at block 1302, wherein a highest interfering eNB (e.g., interfering eNB 632) is identified. Next, at block 1304, channel information relating to the eNB identified at block 1302 is observed. At block 1306, a message is transmitted to the identified eNB requesting reservation of specified resources (e.g., time intervals, subbands, etc.) based on the channel information observed at block 1304. A check can subsequently be performed at block 1308 to determine whether the specified resources have been set aside by the identified eNB, and upon a negative determination the transmission at block 1306 can be repeated. Otherwise, methodology 1300 can proceed to block 1310, wherein it is determined whether other interfering eNBs (e.g., eNBs 634-636) are present. If such eNBs are present, methodology 1300 can return to block 1302 for processing of a next-highest interfering eNB (e.g., as illustrated in diagram 604).

Figure 14:
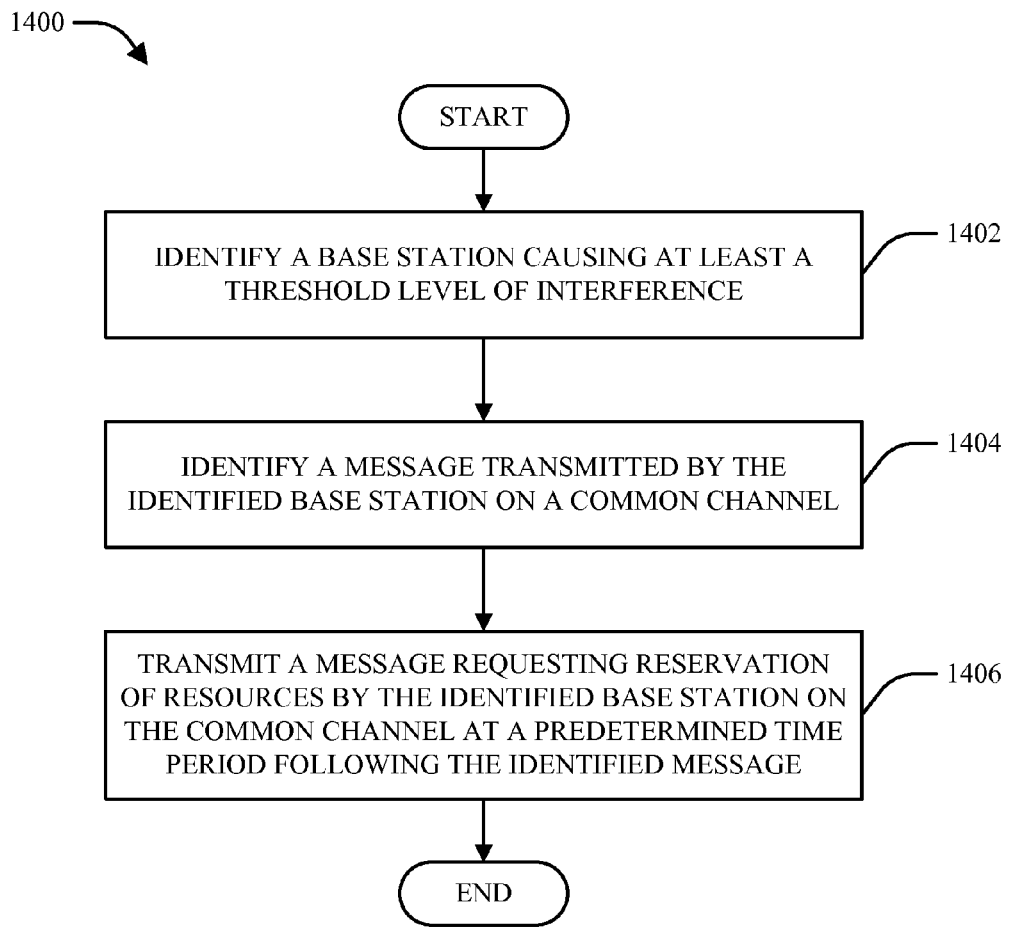

FIG. 14 illustrates a further methodology 1400 for employing unicast messaging in connection with downlink resource partitioning in a wireless communication system. Methodology 1400 can be performed by, for example, a UE and/or any other appropriate network device. Methodology 1400 begins at block 1402, wherein a base station causing at least a threshold level of interference is identified. Next, at block 1404, a message (e.g., LRP 712 or LRP 722) transmitted by the base station identified at block 1402 on a common channel (e.g., a LRP channel) is identified. Methodology 1400 can then conclude at block 1406, wherein a message (e.g., R-SRUM 714 or R-SRUM 724) requesting reservation of resources by the base station identified at block 1402 is transmitted on the common channel at a predetermined time following the message identified at block 1404.

Figure 15:
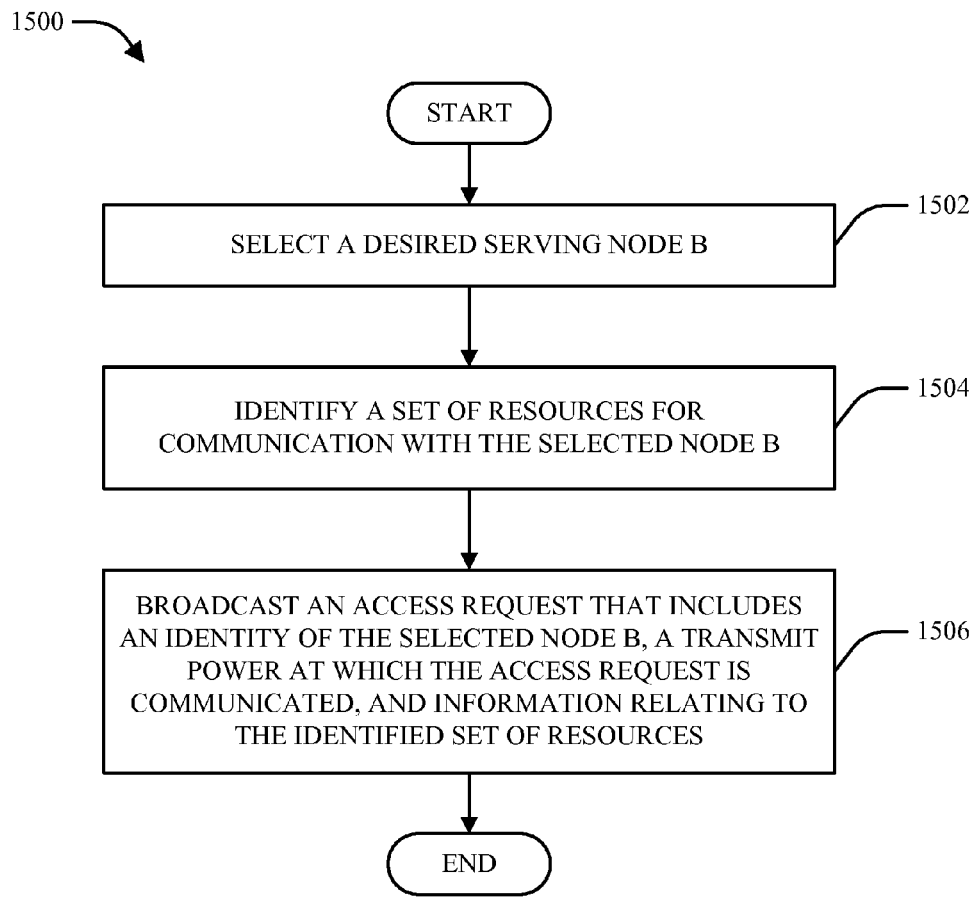
FIGS. 15-16 are flow diagrams of respective methodologies for broadcast messaging for downlink resource partitioning in a wireless communication system.

FIG. 15 illustrates a methodology 1500 for transmitting broadcast resource coordination messaging on the uplink in a wireless communication system. Methodology 1500 can be performed by, for example, a mobile terminal (e.g., terminal 830) and/or any other appropriate network device. Methodology 1500 begins at block 1502, wherein a desired serving Node B (e.g., base station 810 or 820) is selected. Next, at block 1504, a set of resources designated for communication with the Node B selected at block 1502 is identified. Methodology 1500 can then conclude at block 1506, wherein an access request is broadcasted that includes an identity of the selected Node B, a transmit power at which the access request is being communicated, and information relating to the set of resources identified at block 1504.

Figure 16:
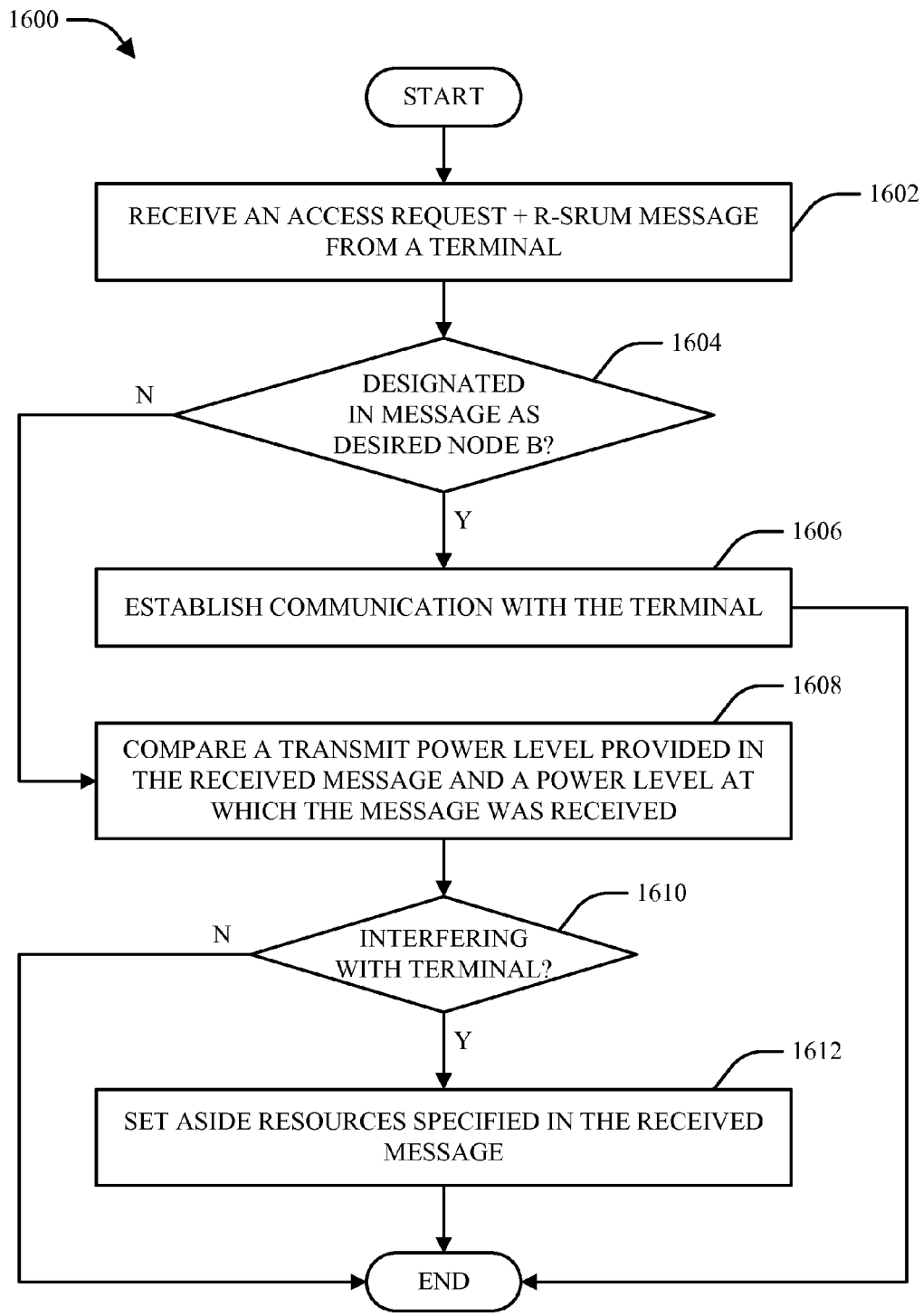

Turning next to FIG. 16, a methodology 1600 for leveraging broadcast access request messaging provided by a mobile terminal (e.g., terminal 830) in connection with downlink resource partitioning is illustrated. Methodology 1600 can be performed by, for example, a Node B (e.g., base station 810 and/or 820) and/or any other appropriate network device. Methodology 1600 begins at block 1602, wherein a message that includes access request and R-SRUM information is received from a terminal. Next, at block 1604, it is determined whether the entity performing methodology 1600 is designated in the message received at block 1602 as a desired Node B. If the entity performing methodology 1600 is so designated, methodology 1600 can conclude at block 1606, wherein communication with the terminal is established.

If the entity performing methodology 1600 is not designated as the desired Node B, methodology 1600 can instead proceed to block 1608, wherein a transmit power level provided in the message received at block 1602 is compared to a power level at which the message was received. At block 1610, it is then determined from the comparison at block 1608 whether the entity performing methodology 1600 is interfering with the terminal from which the access request/R-SRUM message was received. If less than a threshold amount of interference is identified at block 1610, methodology 1600 can conclude. Otherwise, methodology 1600 can proceed to block 1612 prior to concluding, wherein resources specified in the message received at block 1602 are set aside by the entity performing methodology 1600.

Figure 17:
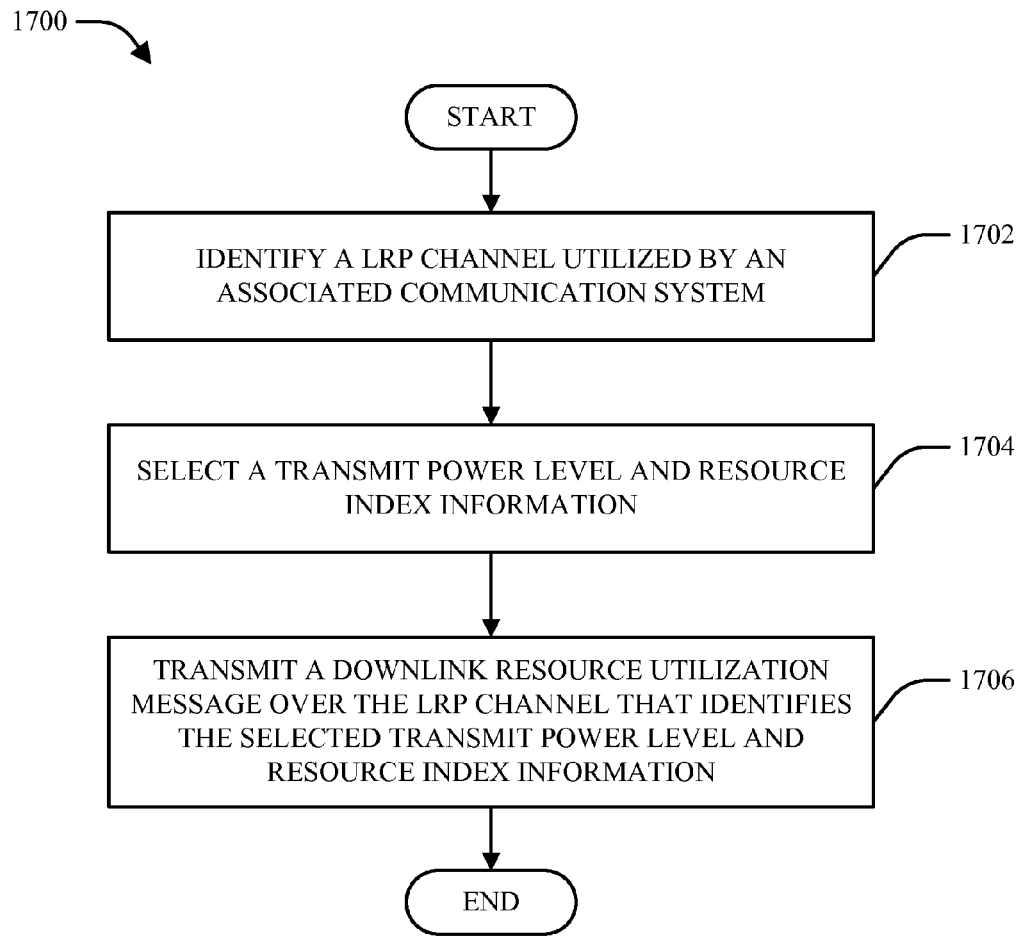
FIGS. 17-18 are flow diagrams of respective methodologies for uplink resource partitioning in a wireless communication system.

Referring to FIG. 17, a methodology 1700 for conducting uplink resource partitioning is illustrated. Methodology 1700 can be performed by, for example, a base station (e.g., eNB 930) and/or any other appropriate network device. Methodology 1700 begins at block 1702, wherein a LRP channel utilized by an associated communication system is identified. Next, at block 1704, a transmit power level and resource index information are selected. Methodology 1700 can then conclude at block 1706, wherein a downlink RUM is transmitted (e.g., to UEs 910 and/or 920) over the LRP channel (e.g., as illustrated by diagram 1000) that identifies the selected the transmit power level and resource index information selected at block 1704.

Figure 18:
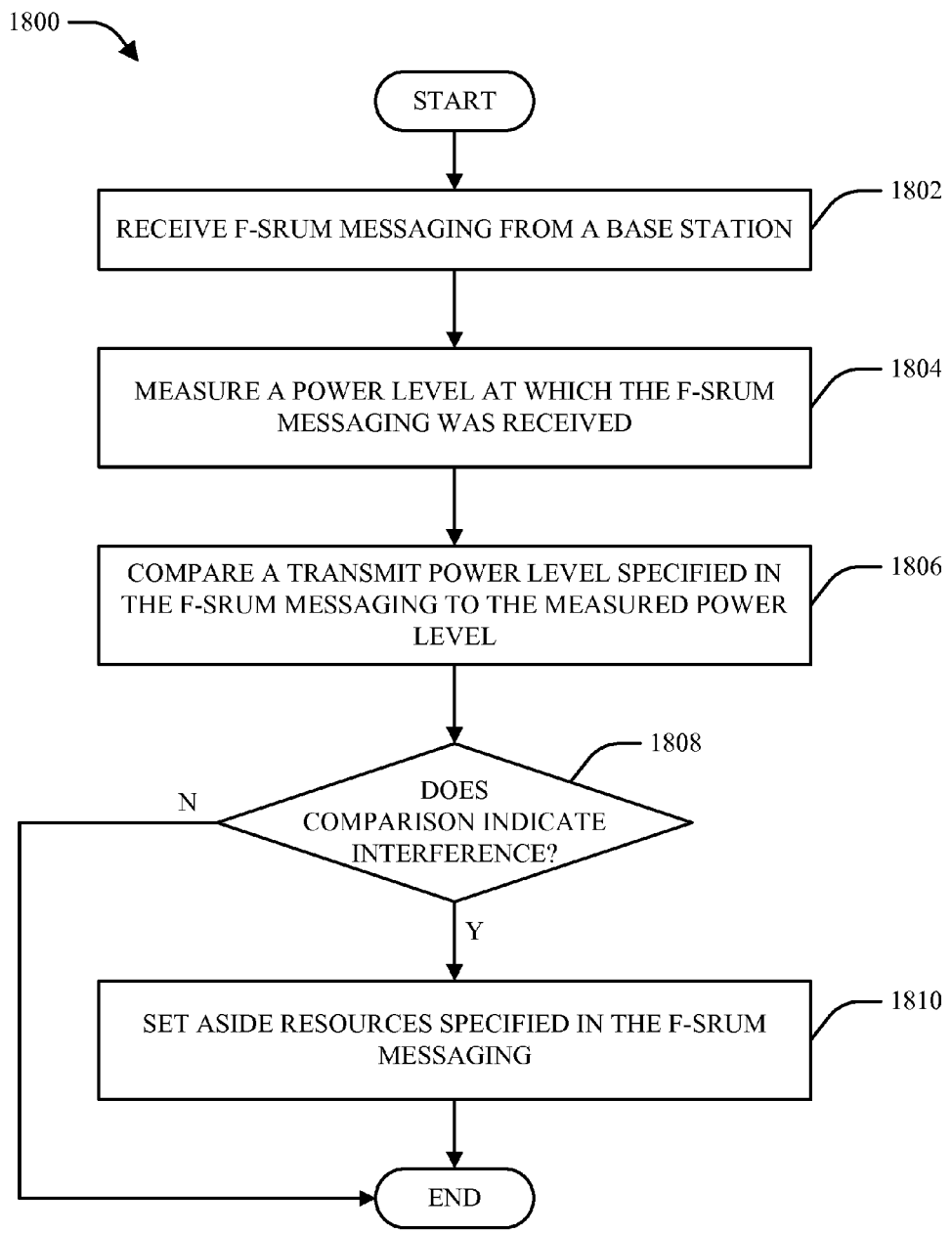

FIG. 18 illustrates another methodology 1800 for uplink resource partitioning in a wireless communication system. Methodology 1800 can be performed by, for example, a terminal (e.g., UE 910 and/or 920) and/or any other appropriate network device. Methodology 1800 begins at block 1802, wherein F-SRUM messaging is received from a base station (e.g., eNB 930). Next, at block 1804, a power level at which the F-SRUM messaging was received at block 1802 is measured. At block 1806, a transmit power level specified in the F-SRUM messaging is then compared to the power level measured at block 1804. At block 1808, it is then determined from the comparison at block 1806 whether an entity performing methodology 1800 is interfering with the base station from which the F-SRUM messaging was received at block 1802. If less than a threshold amount of interference is identified at block 1808, methodology 1800 can conclude. Otherwise, methodology 1800 can proceed to block 1810 prior to concluding, wherein resources specified in the F-SRUM messaging are set aside by the entity performing methodology 1800.

Referring next to FIGS. 19-23, respective apparatus 1900-2300 that facilitate resource partitioning in a wireless communication system are illustrated. It is to be appreciated that apparatus 1900-2300 are represented as including functional blocks, which can be functional blocks that represent functions implemented by a processor, software, or combination thereof (e.g., firmware).

Figure 19:
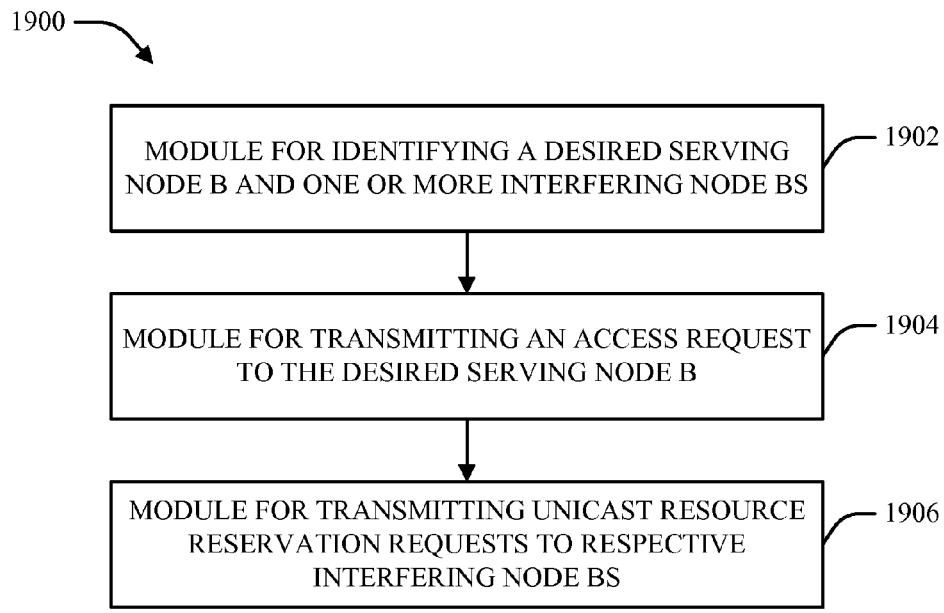
FIGS. 19-23 are block diagrams of respective apparatus that facilitate resource coordination among entities in a wireless communication system.

With reference first to FIG. 19, illustrated is an apparatus 1900 for conducting unicast downlink resource coordination signaling. Apparatus 1900 can be implemented by a mobile terminal (e.g., UE 610) and/or another suitable network device and can include a module 1902 for identifying a desired serving Node B and one or more interfering Node Bs, a module 1904 for transmitting an access request to the desired serving Node B, and a module 1906 for transmitting unicast resource reservation requests to respective interfering Node Bs.

Figure 20:
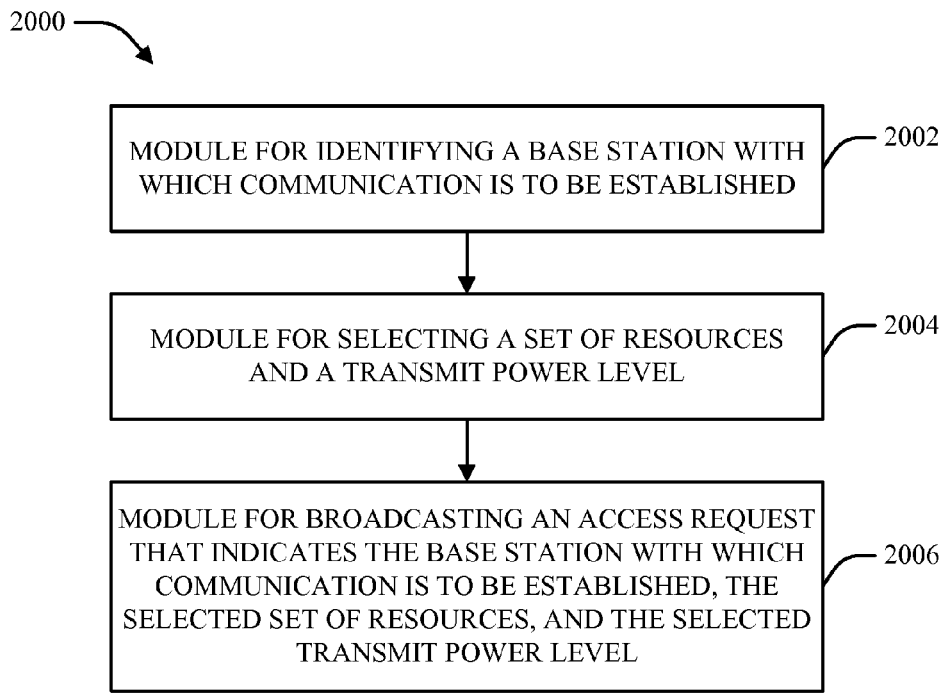

FIG. 20 illustrates an apparatus 2000 for conducting broadcast downlink resource coordination signaling. Apparatus 2000 can be implemented by a UE (e.g., terminal 830) and/or another suitable network device and can include a module 2002 for identifying a base station with which communication is to be established; a module 2004 for selecting a set of resources and a transmit power level; and a module 2006 for broadcasting an access request that indicates the base station with which communication is to be established, the selected set of resources, and the selected transmit power level.

Figure 21:
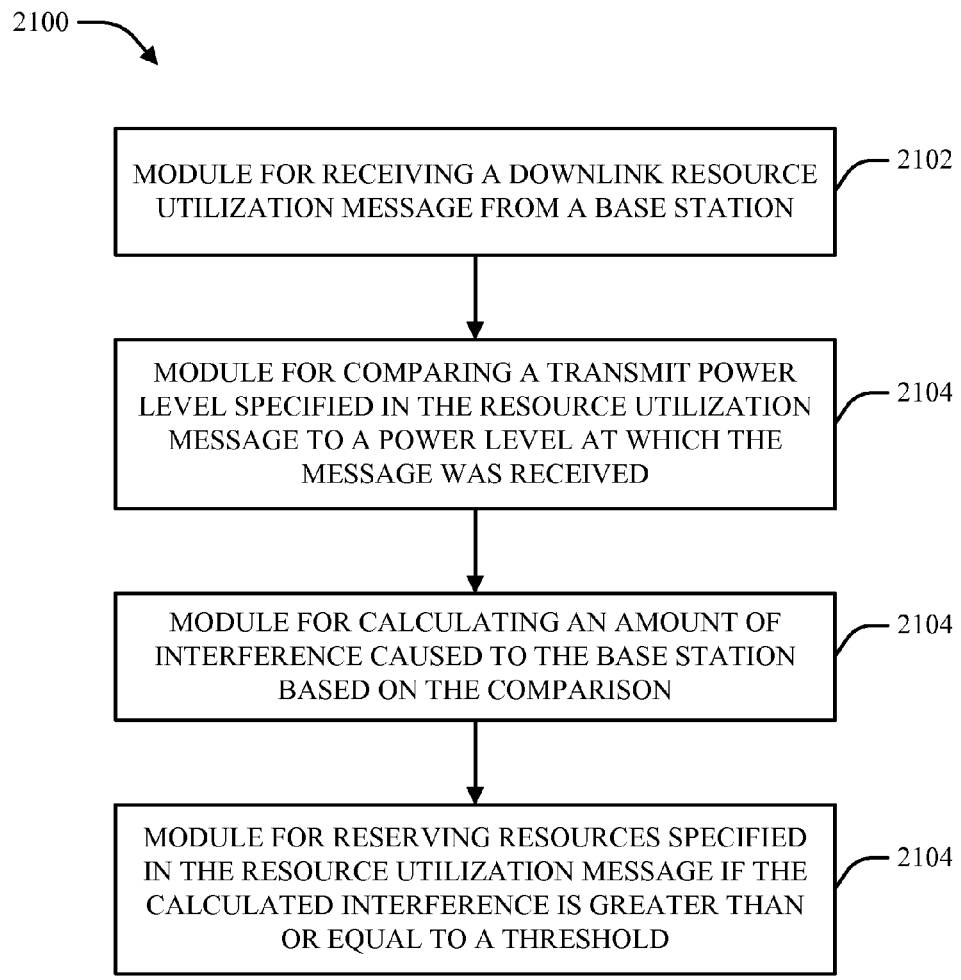

Turning to FIG. 21, an apparatus 2100 for processing uplink resource partitioning messages is illustrated. Apparatus 2100 can be implemented by a terminal (e.g., UE 910 and/or 920) and/or another suitable network device and can include a module 2102 for receiving a downlink RUM from a base station, a module 2104 for comparing a transmit power level specified in the RUM to a power level at which the RUM was received, a module 2106 for calculating an amount of interference caused to the base station based on the comparison, and a module 2108 for reserving resources specified in the RUM if the calculated interference is greater than or equal to a threshold.

Figure 22:
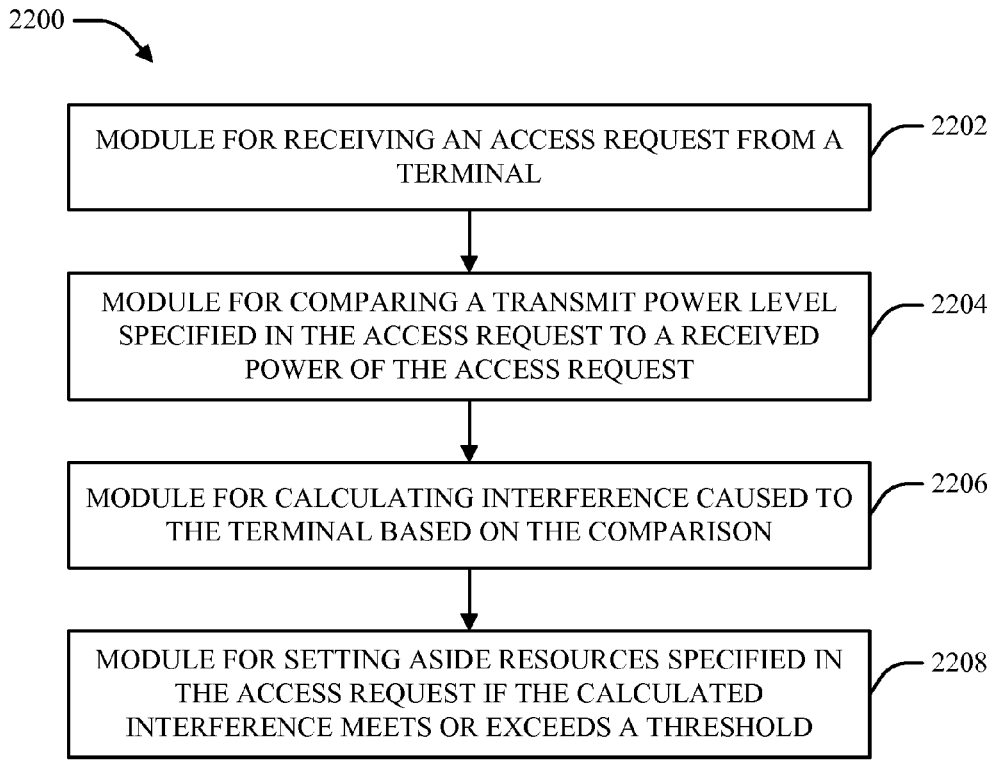

Referring next to FIG. 22, an apparatus 2200 for processing broadcast downlink resource coordination messaging is illustrated. Apparatus 2200 can be implemented by a Node B (e.g., base station 810 and/or 820) and/or another suitable network device and can include a module 2202 for receiving an access request from a terminal, a module 2204 for comparing a transmit power level specified in the access request to a received power level of the access request, a module 2206 for calculating interference caused to the terminal based on the comparison, and a module 2208 for setting aside resources specified in the access request if the calculated interference meets or exceeds a threshold.

Figure 23:
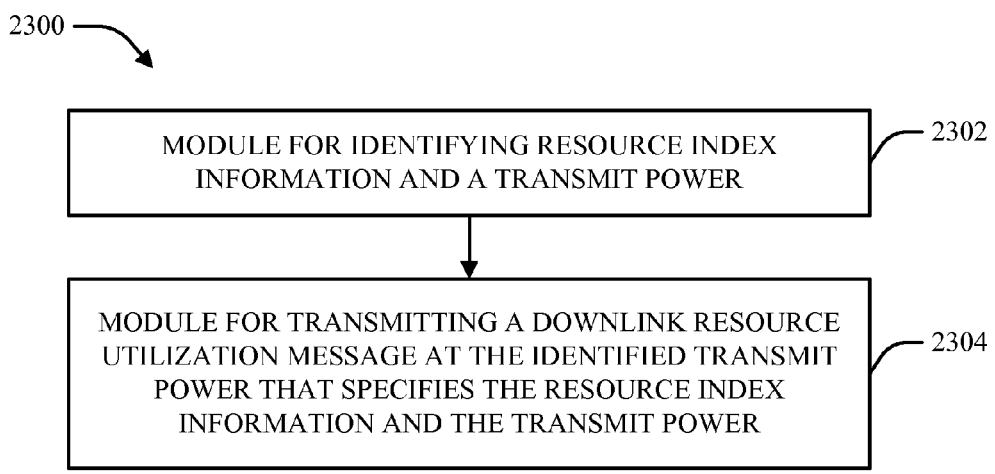

FIG. 23 illustrates an apparatus 2300 for conducting uplink resource coordination signaling. Apparatus 2300 can be implemented by a base station (e.g., eNB 930) and/or another suitable network device and can include a module 2302 for identifying resource index information and a transmit power and a module 2304 for transmitting a downlink RUM at the identified transmit power that specifies the resource index information and the transmit power.

Figure 24:
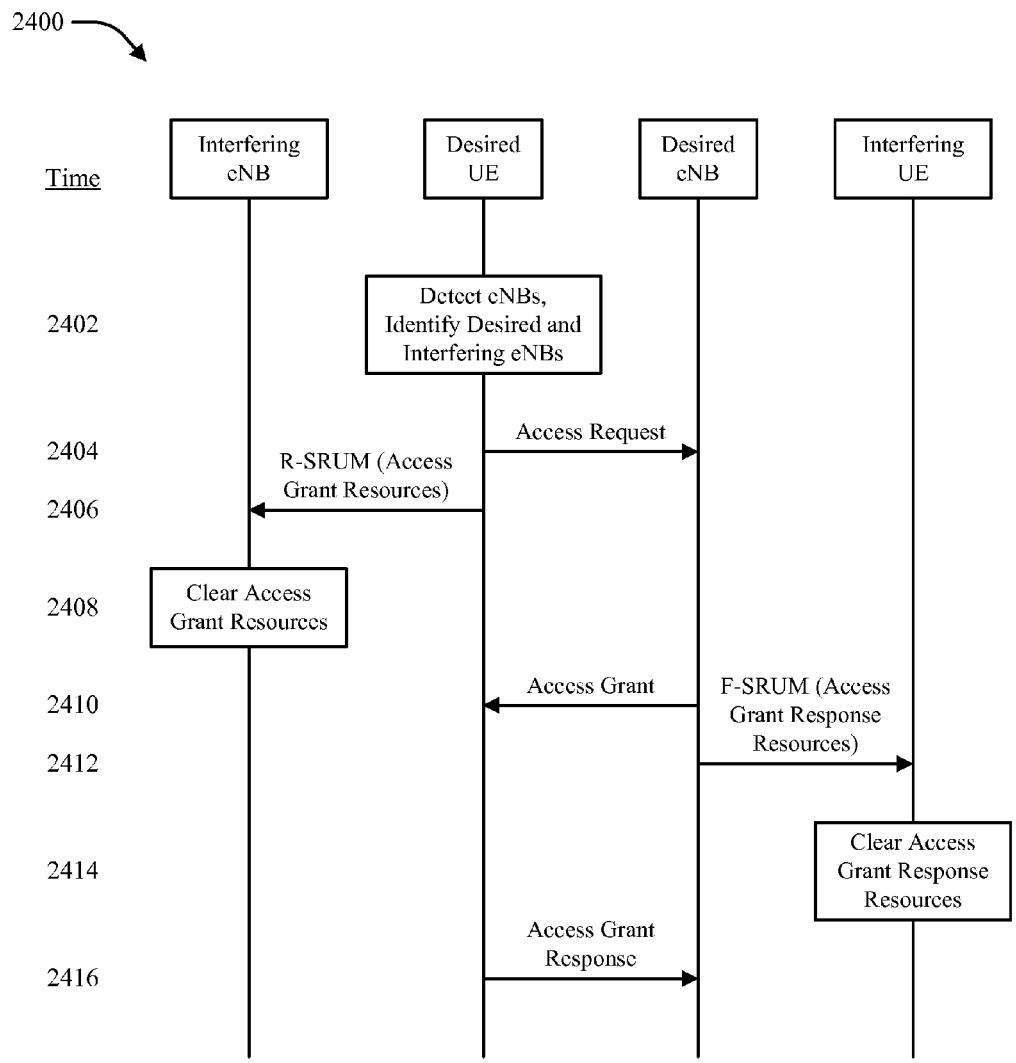
FIG. 24 is a timing diagram that illustrates an example access procedure that can be utilized in accordance with various aspects.

With reference to FIG. 24, a timing diagram 2400 is provided that illustrates an example access procedure that can be implemented in accordance with various aspects herein. In one example, the procedure illustrated by timing diagram 2400 can be executed by a UE and eNB that desire to conduct an access procedure, one or more eNBs that cause interference to the desired UE, and one or more UEs that cause interference to the desired eNB. The procedure illustrated by diagram 2400 can start at time 2402, wherein a UE preparing to conduct an access procedure detects respective eNBs in an associated communication system (e.g., through) and identifies desired and interfering eNBs. Subsequently, the desired UE can submit an Access Request to a desired eNB at time 2404 and transmit respective R-SRUMs to interfering eNBs at time 2406 that indicate downlink resources on which the UE is to receive an indication of an access grant. Upon receiving respective R-SRUMs, one or more interfering eNBs can clear DL resources indicated by the R-SRUMs at time 2408.

After an Access Request from the desired UE has been received by the desired eNB, the desired eNB can respond by transmitting an Access Grant indication to the desired UE on the downlink resources cleared by R-SRUM at time 2410 and submitting respective F-SRUMs to interfering UEs at time 2412 that indicate a set of uplink resources on which the desired UE will respond to the Access Grant indication. In one example, the desired UE can repeat Access Request and R-SRUM transmission as shown at times 2404-2406 until an Access Grant is received from the desired eNB.

In response to receiving respective F-SRUMs from the desired eNB at time 2412, respective interfering UEs can clear the uplink resources specified in the F-SRUMs at time 2414. Finally, at time 2416, the desired UE can submit a response to the Access Grant indication back to the desired eNB over the resources cleared at time 2414. In one example, the desired eNB can repeat Access Grant and F-SRUM transmission as shown at times 2410-2412 until a response to an Access Grant indication is received from the desired UE.

Figure 25:
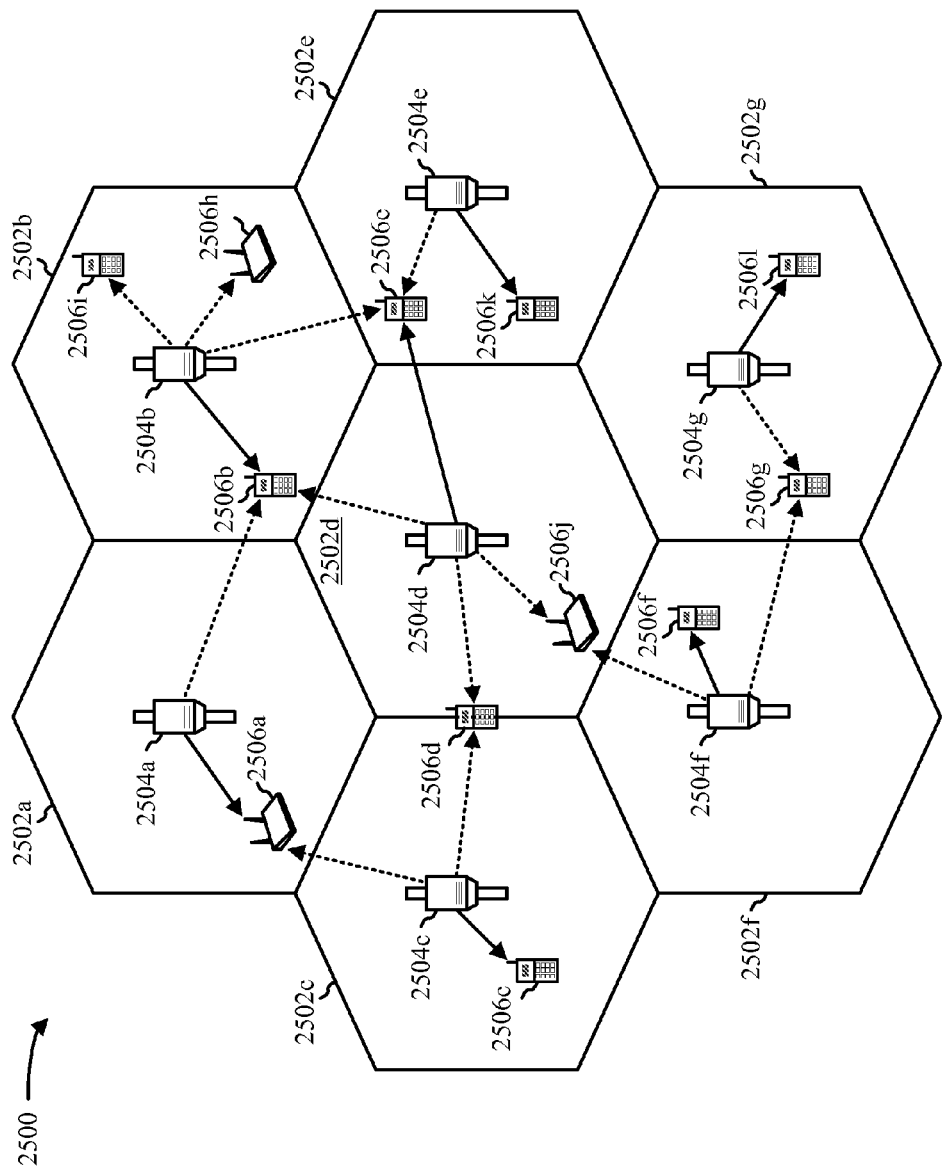
FIG. 25 illustrates an example wireless communication system in accordance with various aspects set forth herein.

Turning to FIG. 25, an exemplary wireless communication system 2500 is illustrated. In one example, system 2500 can be configured to support a number of users, in which various disclosed embodiments and aspects can be implemented. As shown in FIG. 25, by way of example, system 2500 can provide communication for multiple cells 2502, (e.g., macro cells 2502a-2502g), with respective cells being serviced by corresponding access points (AP) 2504 (e.g., APs 2504a-2504g). In one example, one or more cells can be further divided into respective sectors (not shown).

As FIG. 25 further illustrates, various access terminals (ATs) 2506, including ATs 2506a-2506k, can be dispersed throughout system 2500. In one example, an AT 2506 can communicate with one or more APs 2504 on a forward link (FL) and/or a reverse link (RL) at a given moment, depending upon whether the AT is active and whether it is in soft handoff and/or another similar state. As used herein and generally in the art, an AT 2506 can also be referred to as a user equipment (UE), a mobile terminal, and/or any other suitable nomenclature. In accordance with one aspect, system 2500 can provide service over a substantially large geographic region. For example, macro cells 2502a-2502g can provide coverage for a plurality of blocks in a neighborhood and/or another similarly suitable coverage area.

Figure 26:
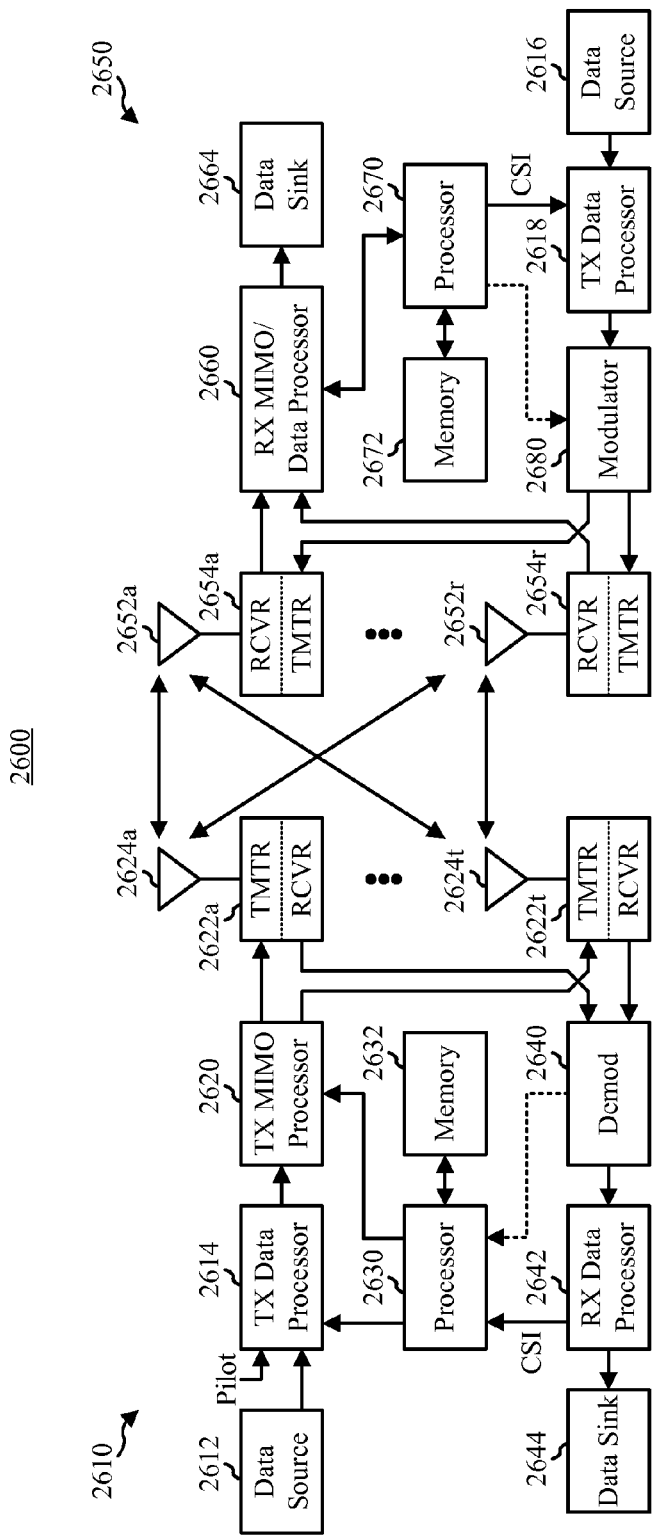
FIG. 26 is a block diagram illustrating an example wireless communication system in which various aspects described herein can function.

Referring now to FIG. 26, a block diagram illustrating an example wireless communication system 2600 in which various aspects described herein can function is provided. In one example, system 2600 is a multiple-input multiple-output (MIMO) system that includes a transmitter system 2610 and a receiver system 2650. It should be appreciated, however, that transmitter system 2610 and/or receiver system 2650 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 2610 and/or receiver system 2650 described herein could be utilized in connection with a single output to single input antenna system.

In accordance with one aspect, traffic data for a number of data streams are provided at transmitter system 2610 from a data source 2612 to a transmit (TX) data processor 2614. In one example, each data stream can then be transmitted via a respective transmit antenna 2624. Additionally, TX data processor 2614 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 2650 to estimate channel response. Back at transmitter system 2610, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 2630.

Next, modulation symbols for all data streams can be provided to a TX processor 2620, which can further process the modulation symbols (e.g., for OFDM). TX MIMO processor 2620 can then provides $N_T$ modulation symbol streams to $N_T$ transceivers 2622a through 2622t. In one example, each transceiver 2622 can receive and process a respective symbol stream to provide one or more analog signals. Each transceiver 2622 can then further condition (e.g., amplify, filter, and upconvert) the analog signals to provide a modulated signal suitable for transmission over a MIMO channel.

Accordingly, $N_T$ modulated signals from transceivers 2622a through 2622t can then be transmitted from $N_T$ antennas 2624a through 2624t, respectively.

In accordance with another aspect, the transmitted modulated signals can be received at receiver system 2650 by $N_R$ antennas 2652a through 2652r. The received signal from each antenna 2652 can then be provided to respective transceivers 2654. In one example, each transceiver 2654 can condition (e.g., filter, amplify, and downconvert) a respective received signal, digitize the conditioned signal to provide samples, and then processes the samples to provide a corresponding "received" symbol stream. An RX MIMO/data processor 2660 can then receive and process the $N_R$ received symbol streams from $N_R$ transceivers 2654 based on a particular receiver processing technique to provide $N_T$ "detected" symbol streams. In one example, each detected symbol stream can include symbols that are estimates of the modulation symbols transmitted for the corresponding data stream. RX processor 2660 can then process each symbol stream at least in part by demodulating, deinterleaving, and decoding each detected symbol stream to recover traffic data for a corresponding data stream. Thus, the processing by RX processor 2660 can be complementary to that performed by TX MIMO processor 2620 and TX data processor 2616 at transmitter system 2610. RX processor 2660 can additionally provide processed symbol streams to a data sink 2664.

In accordance with one aspect, the channel response estimate generated by RX processor 2660 can be used to perform space/time processing at the receiver, adjust power levels, change modulation rates or schemes, and/or other appropriate actions. Additionally, RX processor 2660 can further estimate channel characteristics such as, for example, signal-to-noise-and-interference ratios (SNRs) of the detected symbol streams. RX processor 2660 can then provide estimated channel characteristics to a processor 2670. In one example, RX processor 2660 and/or processor 2670 can further derive an estimate of the "operating" SNR for the system. Processor 2670 can then provide channel state information (CSI), which can comprise information regarding the communication link and/or the received data stream. This information can include, for example, the operating SNR. The CSI can then be processed by a TX data processor 2618, modulated by a modulator 2680, conditioned by transceivers 2654a through 2654r, and transmitted back to transmitter system 2610. In addition, a data source 2616 at receiver system 2650 can provide additional data to be processed by TX data processor 2618.

Back at transmitter system 2610, the modulated signals from receiver system 2650 can then be received by antennas 2624, conditioned by transceivers 2622, demodulated by a demodulator 2640, and processed by a RX data processor 2642 to recover the CSI reported by receiver system 2650. In one example, the reported CSI can then be provided to processor 2630 and used to determine data rates as well as coding and modulation schemes to be used for one or more data streams. The determined coding and modulation schemes can then be provided to transceivers 2622 for quantization and/or use in later transmissions to receiver system 2650. Additionally and/or alternatively, the reported CSI can be used by processor 2630 to generate various controls for TX data processor 2614 and TX MIMO processor 2620. In another example, CSI and/or other information processed by RX data processor 2642 can be provided to a data sink 2644.

In one example, processor 2630 at transmitter system 2610 and processor 2670 at receiver system 2650 direct operation at their respective systems. Additionally, memory 2632 at transmitter system 2610 and memory 2672 at receiver system 2650 can provide storage for program codes and data used by processors 2630 and 2670, respectively. Further, at receiver system 2650, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 27:
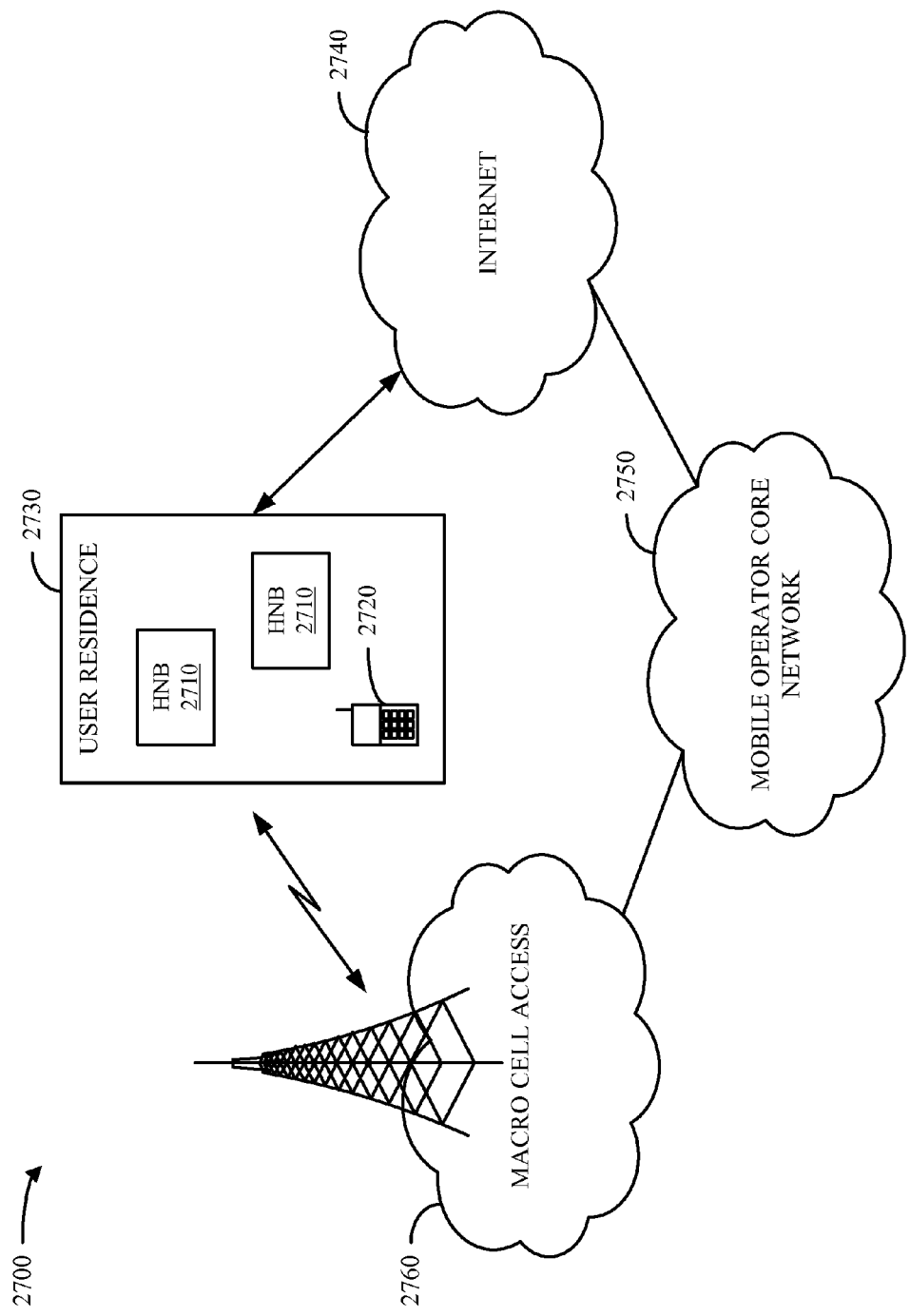
FIG. 27 illustrates an example communication system that enables deployment of access point base stations within a network environment.

FIG. 27 illustrates an example communication system 2700 that enables deployment of access point base stations within a network environment. As shown in FIG. 27, system 2700 can include multiple access point base stations (e.g., femto cells or Home Node B units (HNBs)) such as, for example, HNBs 2710. In one example, respective HNBs 2710 can be installed in a corresponding small scale network environment, such as, for example, one or more user residences 2730. Further, respective HNBs 2710 can be configured to serve associated and/or alien UE(s) 2720. In accordance with one aspect, respective HNBs 2710 can be coupled to the Internet 2740 and a mobile operator core network 2750 via a DSL router, a cable modem, and/or another suitable device (not shown). In accordance with one aspect, an owner of a femto cell or HNB 2710 can subscribe to mobile service, such as, for example, 3G/4G mobile service, offered through mobile operator core network 2750. Accordingly, UE 2720 can be enabled to operate both in a macro cellular environment 2760 and in a residential small scale network environment.

In one example, UE 2720 can be served by a set of Femto cells or HNBs 2710 (e.g., HNBs 2710 that reside within a corresponding user residence 2730) in addition to a macro cell mobile network 2760. As used herein and generally in the art, a home femto cell is a base station on which an AT or UE is authorized to operate on, a guest femto cell refers to a base station on which an AT or UE is temporarily authorized to operate on, and an alien femto cell is a base station on which the AT or UE is not authorized to operate on. In accordance with one aspect, a femto cell or HNB 2710 can be deployed on a single frequency or on multiple frequencies, which may overlap with respective macro cell frequencies.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for wireless communication by a user equipment (UE), comprising:
    transmitting an access request to a desired serving base station;
    transmitting resource utilization messages (RUMs) to one or more interfering base stations; and
    retransmitting the access request and the RUMs based on a time reuse pattern when the UE has not received a response to the access request and the RUMs.

2. The method of claim of claim 1, wherein the access request is transmitted on a clean communication channel, utilized for interference management signaling.

3. The method of claim 1, wherein the access request is transmitted on a Low Reuse Preamble (LRP) channel.

4. The method of claim 1, wherein the one or more interfering base stations comprises a base station causing a highest amount of interference.

5. The method of claim 1, wherein the RUMs comprise a request to reserve resources.

6. An apparatus for wireless communication, comprising:
    means for transmitting an access request to a desired serving base station;
    means for transmitting resource utilization messages (RUMs) to one or more interfering base stations; and
    means for retransmitting the access request and the RUMs based on a time reuse pattern when a user equipment (UE) has not received a response to the access request and the RUMs.

7. The apparatus of claim of claim 6, wherein the access request is transmitted on a clean communication channel, utilized for interference management signaling.

8. The apparatus of claim 6, wherein the access request is transmitted on a Low Reuse Preamble (LRP) channel.

9. The apparatus of claim 6, wherein the one or more interfering base stations comprises a base station causing a highest amount of interference.

10. The apparatus of claim 6, wherein the RUMs comprise a request to reserve resources.

11. An apparatus for wireless communication comprising:
    at least one processor configured to:
        transmit an access request to a desired serving base station;
        transmit resource utilization messages (RUMs) to one or more interfering base stations; and
        retransmit the access request and the RUMs based on a time reuse pattern when a user equipment (UE) has not received a response to the access request and the RUMs; and
    a memory coupled to the at least one processor.

12. The apparatus of claim of claim 11, wherein the access request is transmitted on a clean communication channel, utilized for interference management signaling.

13. The apparatus of claim 11, wherein the access request is transmitted on a Low Reuse Preamble (LRP) channel.

14. The apparatus of claim 11, wherein the one or more interfering base stations comprises a base station causing a highest amount of interference.

15. The apparatus of claim 11, wherein the RUMs comprise a request to reserve resources.

16. A computer-program product for wireless communications, the computer-program product comprising a non-transitory computer-readable medium having code stored thereon, the code executable by one or more processors for:
  transmitting an access request to a desired serving base station;
  transmitting resource utilization messages (RUMs) to one or more interfering base stations; and
  retransmitting the access request and the RUMs based on a time reuse pattern when a user equipment (UE) has not received a response to the access request and the RUMs.

17. The computer-program product of claim of claim 16, wherein the access request is transmitted on a clean communication channel, utilized for interference management signaling.

18. The computer-program product of claim 16, wherein the access request is transmitted on a Low Reuse Preamble (LRP) channel.

19. The computer-program product of claim 16, wherein the one or more interfering base stations comprises a base station causing a highest amount of interference.

20. The computer-program product of claim 16, wherein the RUMs comprise a request to reserve resources.

* * * * *